US012487123B2

(12) United States Patent
Take et al.

(10) Patent No.: US 12,487,123 B2
(45) Date of Patent: Dec. 2, 2025

(54) INFORMATION PROCESSING APPARATUS AND INFORMATION PROCESSING METHOD

(71) Applicant: Saturn Licensing LLC, New York, NY (US)

(72) Inventors: Masahiro Take, Kanagawa (JP); Yuusaku Tagawa, Tokyo (JP); Yusuke Chiba, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 189 days.

(21) Appl. No.: 18/562,137

(22) PCT Filed: May 27, 2022

(86) PCT No.: PCT/JP2022/021766
§ 371 (c)(1),
(2) Date: Nov. 17, 2023

(87) PCT Pub. No.: WO2022/250146
PCT Pub. Date: Dec. 1, 2022

(65) Prior Publication Data
US 2024/0240985 A1    Jul. 18, 2024

(30) Foreign Application Priority Data
May 28, 2021    (JP) .................................. 2021-090231

(51) Int. Cl.
*G01J 3/46*    (2006.01)
*G01J 3/28*    (2006.01)
(Continued)

(52) U.S. Cl.
CPC ............. *G01J 3/462* (2013.01); *G01J 3/2823* (2013.01); *H04N 1/6086* (2013.01); *H04N 1/6088* (2013.01); *H04N 23/84* (2023.01)

(58) Field of Classification Search
CPC ......... G01J 3/462; H04N 1/60; H04N 1/6086; H04N 1/6088; H04N 23/84
See application file for complete search history.

(56) References Cited

U.S. PATENT DOCUMENTS 6,654,491 B1 *  11/2003  Hidaka ................ H04N 1/6088
                                                              358/518
2002/0196972 A1    12/2002  Bayramoglu
(Continued)

FOREIGN PATENT DOCUMENTS

JP    H11085952 A    3/1999
JP    2002221931 A   8/2002
(Continued)

OTHER PUBLICATIONS

International Search Report for PCT/JP2022/021766 mailed Jul. 12, 2022; 3 pages.

*Primary Examiner* — Thanh Luu
(74) *Attorney, Agent, or Firm* — Richard LaPeruta

(57) ABSTRACT

An information processing apparatus includes a control unit. The control unit calculates an RGB value output by an imaging apparatus when imaging of a predetermined color is performed by using the imaging apparatus by using characteristic data related to a spectroscopic sensitivity characteristic of the imaging apparatus, photographing-side spectroscopic data, and color spectroscopic data. The control unit acquires display-side spectroscopic data related to a spectroscopic distribution characteristic of a light source in a display environment in which imaged data imaged by the imaging apparatus is displayed on a display apparatus. The control unit calculates an XYZ value when the predetermined color is displayed on the display apparatus by using the display-side spectroscopic data and the color spectro-
(Continued)

scopic data. The control unit calculates conversion information for converting the RGB value into the XYZ value.

16 Claims, 16 Drawing Sheets

(51) Int. Cl.
*H04N 1/60* (2006.01)
*H04N 23/84* (2023.01)

(56) References Cited

U.S. PATENT DOCUMENTS

2006/0109351 A1 5/2006 Ishii
2016/0337629 A1 11/2016 Koike

FOREIGN PATENT DOCUMENTS

| JP | 2003085531 A | 3/2003 |
| JP | 2011211317 A | 10/2011 |
| JP | 2015177484 A | 10/2015 |

* cited by examiner

| RGB VALUE | XYZ VALUE |
|---|---|
| 2F1 | 2D3 |
| A8C | 96F |
| ⋮ | |
| F2B | EFC |

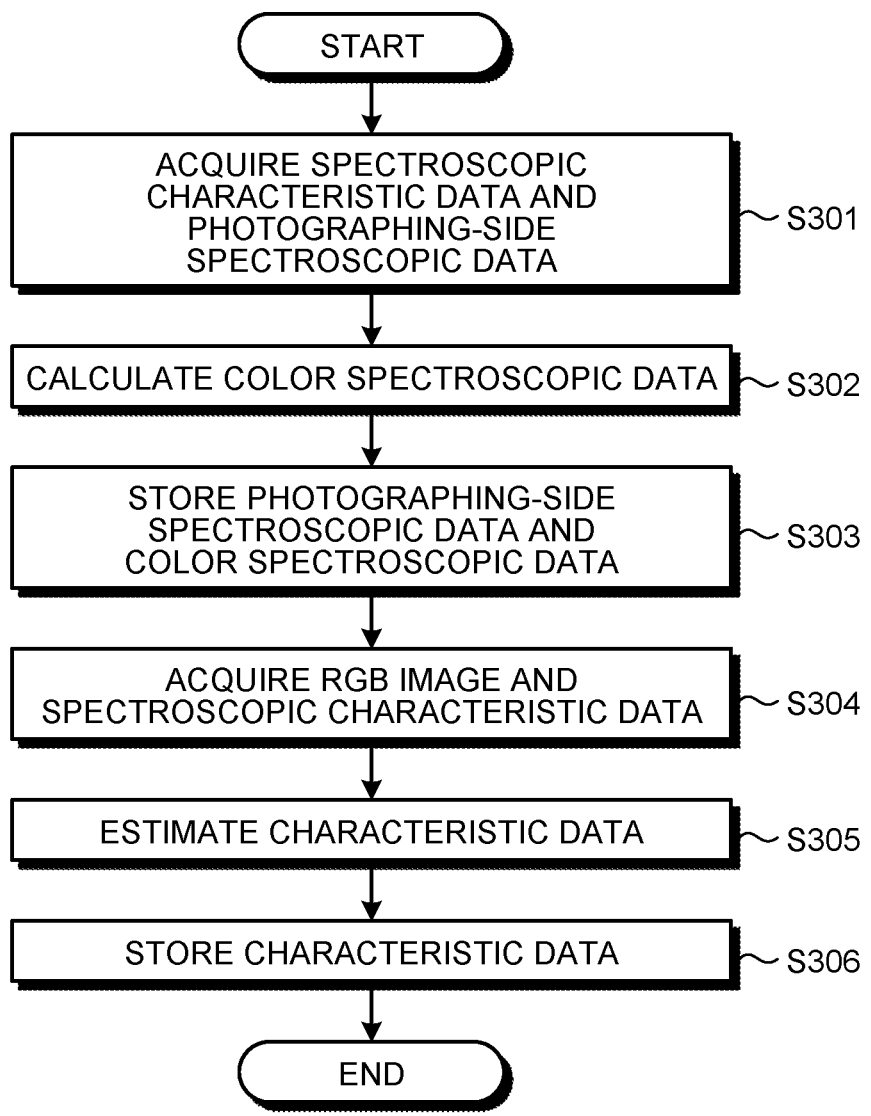

INFORMATION PROCESSING APPARATUS AND INFORMATION PROCESSING METHOD

CROSS-REFERENCE TO RELATED APPLICATIONS

This application is a national phase entry under 35 U.S.C. § 371 of International Application No. PCT/JP2022/021766 filed May 27, 2022, which claims the priority from Japanese Patent Application No. 2021-090231 filed in the Japanese Patent Office on May 28, 2021, the entire contents of which are hereby incorporated by reference.

FIELD

The present disclosure relates to an information processing apparatus and an information processing method.

BACKGROUND

In a case where image data obtained by photographing a subject by a camera is displayed on a monitor, a display method is known in which the image data is displayed such that a color in which an observer actually visually recognizes the subject and a color displayed on the monitor are the same (see, for example, Patent Literature 1).

In such a display method, a plurality of videos displayed on a reference monitor are photographed by a camera, and a correspondence relationship between an RGB value of an image photographed by the camera and an XYZ value of the video is held. In such a display method, the RGB value obtained by photographing a subject by using the reference monitor as a light source are converted into the XYZ value based on the held correspondence relationship and displayed on the reference monitor, so that the color of the subject on a photographing side is reproduced on the reference monitor.

CITATION LIST

Patent Literature

Patent Literature 1: JP 2015-177484 A

SUMMARY

Technical Problem

In the above-described display method, it is necessary to display a plurality of videos on the reference monitor and photograph the videos with the camera. In addition, it is necessary to photograph the subject by using the reference monitor as the light source, and a photographing condition of the subject is also limited. As described above, the conventional display method has a problem in that the color of the subject on the photographing side is more easily reproduced on the monitor (display side).

Therefore, the present disclosure provides a mechanism that can more easily reproduce the color of the subject on the photographing side on the display side.

Note that the above problem or object is merely one of a plurality of problems or objects that can be solved or achieved by a plurality of embodiments disclosed in the present specification.

Solution to Problem

According to the present disclosure, an information processing apparatus is provided. The information processing apparatus includes a control unit. The control unit acquires characteristic data related to a spectroscopic sensitivity characteristic of an imaging apparatus. The control unit acquires photographing-side spectroscopic data related to a spectroscopic distribution characteristic of a light source in a photographing environment in which the imaging apparatus performs imaging. The control unit acquires color spectroscopic data related to a spectroscopic reflectance characteristic of a predetermined color. The control unit calculates an RGB value output by the imaging apparatus when imaging of the predetermined color is performed by using the imaging apparatus by using the characteristic data, the photographing-side spectroscopic data, and the color spectroscopic data. The control unit acquires display-side spectroscopic data related to a spectroscopic distribution characteristic of a light source in a display environment in which imaged data imaged by the imaging apparatus is displayed on a display apparatus. The control unit calculates an XYZ value when the predetermined color is displayed on the display apparatus by using the display-side spectroscopic data and the color spectroscopic data. The control unit calculates conversion information for converting the RGB value into the XYZ value.

BRIEF DESCRIPTION OF DRAWINGS

FIG. 20 is a flowchart illustrating a flow of an example of information processing executed by the information processing apparatus according to the fifth modification of the embodiment of the present disclosure.

DESCRIPTION OF EMBODIMENTS

Figure 1A:
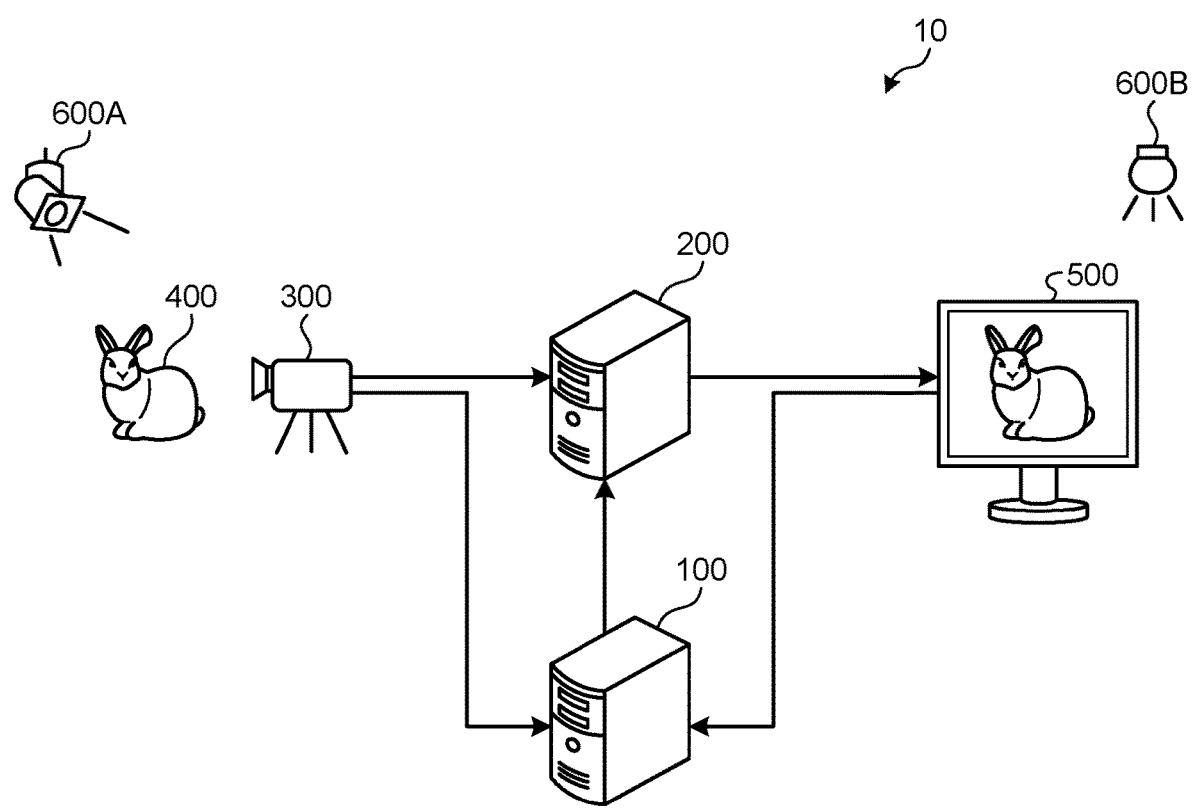
FIG. 1A is a diagram for describing an outline of an information processing system according to an embodiment of the present disclosure.

Hereinafter, embodiments of the present disclosure will be described in detail with reference to the accompanying drawings. Note that in the present specification and the drawings, components having substantially the same functional configuration are denoted by the same reference numerals, and redundant description is omitted.

One or a plurality of embodiments (including examples and modifications) described below can each be implemented independently. On the other hand, at least some of the plurality of embodiments described below may be appropriately combined with at least some of other embodiments. The plurality of embodiments may include novel features different from each other. Therefore, the plurality of embodiments can contribute to solving different objects or problems, and can exhibit different effects.

1. Outline of Information Processing System

<1.1. Outline Configuration Example of Information Processing System>

FIG. 1A is a diagram for describing an outline of an information processing system 10 according to an embodiment of the present disclosure. The information processing system 10 includes an information processing apparatus 100, a conversion apparatus 200, an imaging apparatus 300, and a display apparatus 500.

The imaging apparatus 300 is a camera that photographs an image of a subject 400 by using a photographing-side illumination apparatus 600A as a photographing-side light source and generates an imaged image. The imaging apparatus 300 may photograph a moving image of the subject 400 or may photograph a still image.

The display apparatus 500 is an apparatus that displays the imaged image photographed by the imaging apparatus 300 to an observer (not illustrated). The display apparatus 500 displays the imaged image to the observer by using a display-side illumination apparatus 600B as a display-side light source.

As described above, in a case where the imaged image imaged by the imaging apparatus 300 is displayed on the display apparatus 500, there is a case where it is desired to estimate a color of the subject visually recognized by the observer in a case where the display-side illumination apparatus 600B is used as a light source and reproduce it on the display apparatus 500.

For example, it is assumed that an imaged image obtained by photographing a patient in a hospital A is displayed on a monitor (display apparatus 500) of a hospital B, and a doctor (observer) performs an examination. In this case, by reproducing the complexion of the patient displayed on the monitor with the same color as when observed by the doctor in the hospital B, the doctor can examine the patient in the hospital A in the same manner as in the case of being in the hospital B.

As described above, as a method of reproducing a color under the display-side illumination apparatus 600B from the imaged image imaged by the imaging apparatus 300, there is a method of acquiring color coordinates of the imaged image as a color absolute coordinate XYZ value. More specifically, in such a method, the information processing system 10 acquires the color coordinates of the subject 400 and the photographing-side illumination apparatus 600A as the XYZ value. As a result, the information processing system 10 can hold the absolute coordinates of the color from imaging by the imaging apparatus 300 to display by the display apparatus 500.

However, in this case, the imaging apparatus 300 needs to be an apparatus that generates an imaged image of the XYZ value. That is, the imaging apparatus 300 needs to be an apparatus called a so-called XYZ camera imitating spectroscopic characteristics of human eyes. However, the XYZ camera is expensive and not common.

Therefore, in the information processing system 10 according to the proposed technology of the present disclosure, an imaged image (hereinafter, also referred to as an RGB image) of an RGB value is imaged by using the imaging apparatus 300 (so-called RGB camera) that images RGB images. In the information processing system 10, the conversion apparatus 200 performs conversion processing of converting the RGB value of the RGB image into the XYZ value, thereby acquiring the imaged image of the XYZ value.

The information processing apparatus 100 generates conversion information used for conversion processing by the conversion apparatus 200. For example, when displaying the RGB image imaged by the imaging apparatus 300 on the display apparatus 500, the information processing apparatus 100 generates conversion information for displaying the same color as the color visually recognized when the observer directly observes the subject 400 on the display apparatus 500.

As described above, the information processing system 10 in FIG. 1A is a system that estimates the color of the subject 400 visually recognized in a case where the display-side illumination apparatus 600B is used as a light source, from the imaged image imaged by the imaging apparatus 300 by using the photographing-side illumination apparatus 600A as a light source and reproduces it on the display apparatus 500.

<1.2. Problems of Conventional Technology>

Here, as a color reproduction system that estimates and reproduces a color under a predetermined light source based on an RGB image, for example, a system disclosed in JP 2001-8220 A is known. Such a color reproduction system estimates a color of a subject under predetermined illumination light by using statistical data of spectroscopic reflectance of the subject. At this time, in the color reproduction system, the color estimation of the subject is performed with high accuracy by switching the statistical data according to a photographing signal of the subject.

However, in the above system, the color estimation of the subject is performed by using statistical data based on a prescribed illumination light spectrum. Therefore, for example, in a case where the illumination light on the photographing side on which the subject is photographed is changed or the illumination light on the observation side where the monitor is installed is changed, there is a concern that the accuracy of the color estimation of the subject is deteriorated.

Therefore, for example, a system capable of more flexibly changing the illumination light after introduction of the system, such as changing the illumination light later, is required.

In the above system, the color estimation is performed by using the statistical data of the spectroscopic reflectance of the subject, but the spectroscopic reflectance is held in units of 1 nm between 380 nm and 780 nm in a visible range. In this case, the system holds 400 pieces of data per color, and the amount of operation for calculating the statistical data becomes very large. Therefore, there is a concern that a system needs to be constructed by using special hardware for performing the operation. Alternatively, there is a concern that the system can only perform color estimation of a still image instead of a moving image.

Therefore, it is desired to construct a system capable of further reducing the amount of operation and more easily reproducing the color of the subject on the photographing side on the monitor.

Therefore, the proposed technology of the present disclosure provides a mechanism capable of more easily reproducing the color of the subject on the photographing side on the monitor in the color reproduction system technology of reproducing the color of the subject on the photographing side on the monitor (display apparatus) on the display side.

More specifically, the information processing apparatus 100 of the information processing system 10 calculates conversion information for converting the photographed image (RGB image) into a display image (converted image). For example, the information processing apparatus 100 acquires characteristic data related to a spectroscopic sensitivity characteristic of the imaging apparatus 300. The information processing apparatus 100 acquires imaging-side spectroscopic data related to a spectroscopic distribution characteristic of a light source (for example, the photographing-side illumination apparatus 600A) in an imaging environment in which the imaging apparatus 300 performs imaging. The information processing apparatus 100 acquires color spectroscopic data related to a spectroscopic reflectance characteristic of a predetermined color (sample color). The information processing apparatus 100 uses the acquired characteristic data, imaging-side spectroscopic data, and color spectroscopic data to calculate an RGB value output by the imaging apparatus 300 in a case where a sample color is photographed by using the imaging apparatus 300.

Furthermore, the information processing apparatus 100 acquires display-side spectroscopic data related to a spectroscopic distribution characteristic of a light source (for example, the display-side illumination apparatus 600B) in a display environment in which the display apparatus 500 is displayed. The information processing apparatus 100 calculates an XYZ value in a case where the sample color is displayed on the display apparatus 500 by using the acquired display-side spectroscopic data and color spectroscopic data. The information processing apparatus 100 calculates conversion information for converting the calculated RGB value into an XYZ value.

Note that, here, as an application example of the color reproduction system, for example, a case where the color reproduction system is applied to remote medical care has been described, but the application example is not limited thereto. For example, the color reproduction system can be applied to an inspection system in the factory. More specifically, for example, the color reproduction system technology of the proposed technology of the present disclosure can be applied in a case where the color or the like of a product manufactured in a factory is confirmed at a remote place.

<1.3. Outline of Information Processing>

Figure 1B:
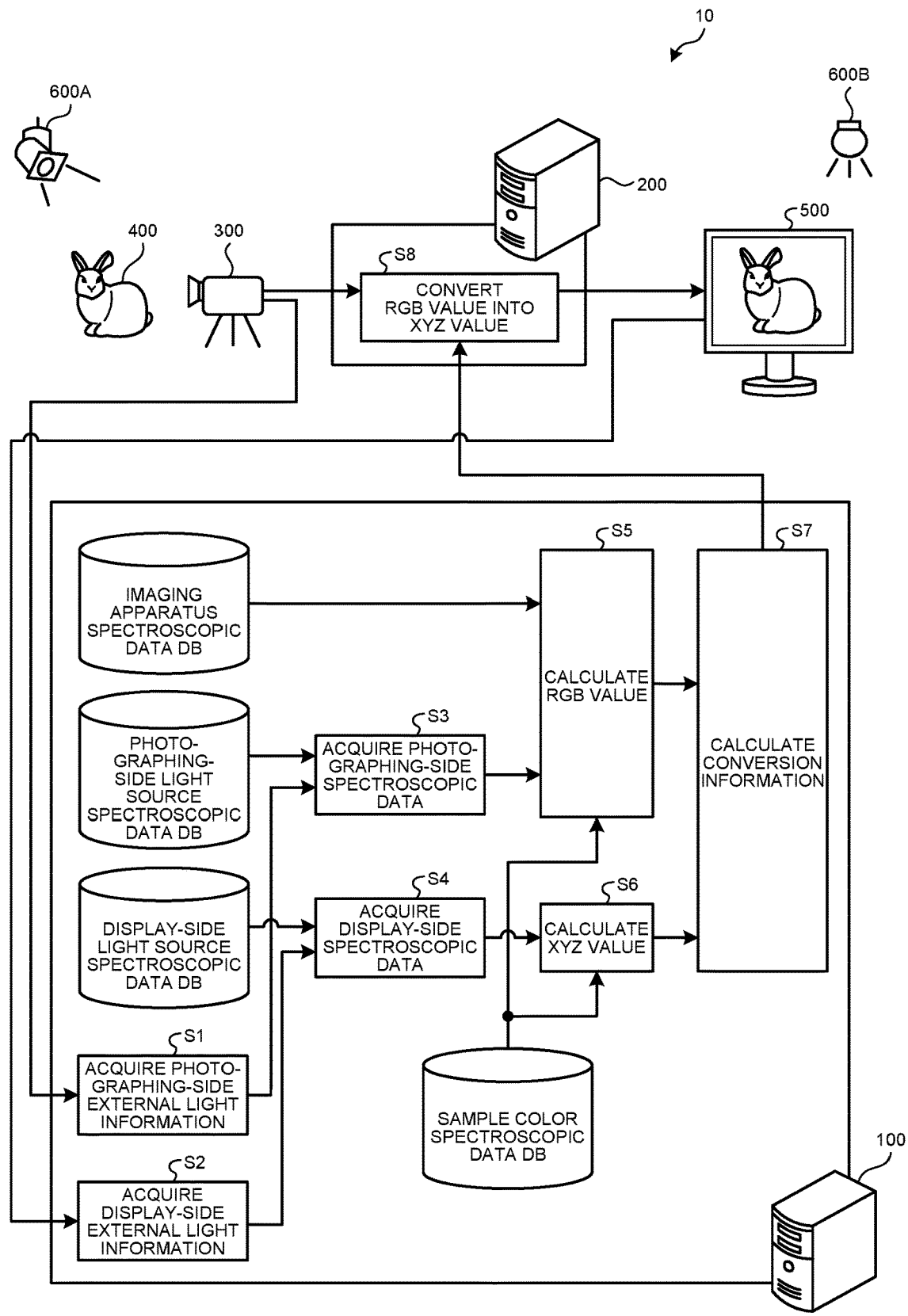
FIG. 1B is a diagram for describing an outline of information processing according to the embodiment of the present disclosure.

FIG. 1B is a diagram for describing an outline of information processing according to an embodiment of the present disclosure. Such information processing is processing of generating conversion information used for conversion from an RGB image (imaged image) into an XYZ image (display image) performed by the conversion apparatus 200.

For example, the information processing apparatus 100 acquires photographing-side external light information from an external light sensor (not illustrated) mounted on the imaging apparatus 300 (step S1). The photographing-side external light information can include, for example, information related to the photographing-side illumination apparatus 600A.

For example, the information processing apparatus 100 acquires display-side external light information from an external light sensor (not illustrated) mounted on the display apparatus 500 (step S2). The display-side external light information can include, for example, information related to the display-side illumination apparatus 600B.

The information processing apparatus 100 acquires the imaging-side spectroscopic data related to the spectroscopic distribution characteristic of the photographing-side illumination apparatus 600A from a photographing-side light source spectroscopic data DB based on the acquired photographing-side external light information (step S3).

Based on the acquired display-side external light information, the information processing apparatus 100 acquires the display-side spectroscopic data related to the spectroscopic distribution characteristic of the display-side illumination apparatus 600B from a display-side light source spectroscopic data DB (step S4).

The information processing apparatus 100 calculates an RGB value based on characteristic data acquired from an imaging apparatus spectroscopic data DB, the photographing-side spectroscopic data acquired in step S3, and the color spectroscopic data acquired from a sample color spectroscopic data DB (step S5). Here, the characteristic data is information related to the spectroscopic sensitivity characteristic of the imaging apparatus 300. In addition, the color spectroscopic data is information related to a spectroscopic reflectance characteristic of a predetermined sample color. For example, the color spectroscopic data may include information related to spectroscopic reflectance characteristics of a plurality of (for example, 1000 to 2000 colors) sample colors.

For example, the information processing apparatus 100 calculates an RGB value output by the imaging apparatus 300 when the subject 400 of a sample color is imaged under the photographing-side illumination apparatus 600A, based on the characteristic data, the photographing-side spectroscopic data, and the color spectroscopic data. The information processing apparatus 100 calculates the RGB value for each of a plurality of sample colors.

Next, the information processing apparatus 100 calculates an XYZ value based on the display-side spectroscopic data acquired in step S4 and the color spectroscopic data acquired from the sample color spectroscopic data DB (step S6).

For example, in a case where the subject 400 of the sample color is displayed under the display-side illumination apparatus 600B, the information processing apparatus 100 calculates the XYZ value to be displayed on the display apparatus 500 based on the display-side spectroscopic data and the color spectroscopic data. The information processing apparatus 100 calculates the XYZ value for each of a plurality of sample colors.

The information processing apparatus 100 calculates conversion information for converting an RGB image into an XYZ image based on the RGB value calculated in step S5 and the XYZ value calculated in step S6 (step S7). The conversion information is, for example, information that associates the RGB value with the XYZ value for each of the plurality of sample colors. Details of the conversion information will be described later.

Note that the conversion apparatus 200 converts the RGB value of the image imaged by the imaging apparatus 300 into a converted image of the XYZ value by using the conversion information calculated by the information processing apparatus 100 (step S8), and displays the converted image on the display apparatus 500. Here, in a case where the display apparatus 500 is an apparatus that displays an image of the XYZ value, the conversion apparatus 200 outputs the converted image of the XYZ value to the display apparatus 500. On the other hand, in a case where the display apparatus 500 is an apparatus that displays an image of the RGB value, the conversion apparatus 200 may convert the converted image of the XYZ value into a converted image of the RGB value and output the converted image to the display apparatus 500.

Note that the conversion from the RGB image into the converted image of the XYZ value by the conversion apparatus 200 is performed for each pixel of the RGB image in units of frames. On the other hand, the calculation of the conversion information performed by the information processing apparatus 100 can be performed, for example, in a case where the photographing-side illumination apparatus 600A or the display-side illumination apparatus 600B is switched or in a case where a color sample (color sample) including a plurality of sample colors is switched.

The color sample can be switched according to a type of the subject 400, such as a skin color of a person. That is, in a case where the type of an imaging target of the imaging apparatus 300 is switched, the color spectroscopic data of the color sample can be switched, but in general, the possibility of switching the color sample is low, and it is considered that the color sample is fixed.

Note that in a case of adaptively coping with switching of the photographing-side illumination apparatus 600A or the display-side illumination apparatus 600B, the information processing apparatus 100 performs information processing of calculating the conversion information at a predetermined cycle, for example, in units of several seconds.

As described above, the information processing system 10 according to the present embodiment images the spectroscopy of the subject 400 including the photographing-side light source (photographing-side illumination apparatus 600A) with the imaging apparatus 300 to acquire the RGB image. The information processing system 10 converts the acquired RGB image into absolute color coordinates XYZ under the display-side light source (display-side illumination apparatus 600B) by using the conversion information. As described above, in the information processing system 10 according to the present embodiment, since the spectroscopic reflectance of the subject 400 is not estimated, the amount of operation required for conversion can be reduced.

Further, the conversion information is calculated based on the color spectroscopic data of the sample color and the like. As described above, such conversion information may be recalculated, for example, when the photographing-side illumination apparatus 600A or the display-side illumination apparatus 600B is switched. Therefore, the amount of operation performed by the information processing system 10 according to the present embodiment can be further reduced, and the color of the subject 400 on the photographing side can be more easily reproduced on the display apparatus 500.

Furthermore, the information processing system 10 calculates the conversion information by using, for example, the photographing-side external light information and the display-side external light information acquired from the external light sensor. Therefore, the information processing system 10 can easily update the conversion information even in a case where the illumination apparatus is switched after introduction of the system, and can change the conversion information more flexibly.

2. Configuration Example of Information Processing System

Next, a configuration example of each apparatus of the information processing system 10 according to the embodiment of the present disclosure will be described.

[Illumination Apparatus 600]

First, the photographing-side illumination apparatus 600A and the display-side illumination apparatus 600B will be described. When the photographing-side illumination apparatus 600A and the display-side illumination apparatus 600B are not particularly distinguished, they are also simply referred to as an illumination apparatus 600. The illumination apparatus 600 is used as a light source of the information processing system 10.

As the illumination apparatus 600, for example, an incandescent lamp, a fluorescent lamp, a light emitting diode (LED), or the like can be used. Further, instead of the illumination apparatus 600, sunlight may be used as the light source of the information processing system 10.

Note that the photographing-side light source may be the same type of light source as the display-side light source, or may be a different type of light source. Furthermore, there may be a case where the photographing-side light source and the display-side light source are the same, such as a case where the imaging apparatus 300 and the display apparatus 500 are disposed in the same environment, for example, disposed in one room.

[Imaging Apparatus 300]

Figure 2:
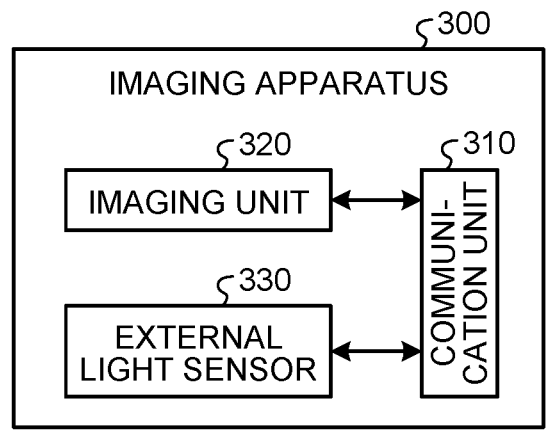
FIG. 2 is a block diagram illustrating a configuration example of an imaging apparatus according to the embodiment of the present disclosure.

Next, the imaging apparatus 300 of the information processing system 10 will be described with reference to FIG. 2. FIG. 2 is a block diagram illustrating a configuration example of the imaging apparatus 300 according to the embodiment of the present disclosure. The imaging apparatus 300 illustrated in FIG. 2 includes a communication unit 310, an imaging unit 320, and an external light sensor 330.

(Communication Unit 310)

The communication unit 310 is a communication interface that communicates with an external apparatus via a network in a wired or wireless manner. The communication unit 310 is realized by, for example, a network interface card (NIC) or the like.

(Imaging Unit 320)

The imaging unit 320 images the subject 400 to generate an imaged image (RGB image). The imaging unit 320 is, for example, an image sensor. The imaging unit 320 images and generates, for example, a moving image or a still image. The imaging unit 320 outputs the imaged image to the conversion apparatus 200 via the communication unit 310.

(External Light Sensor 330)

The external light sensor 330 is an apparatus that acquires information of an imaging-side light source. The external light sensor 330 includes, for example, a plurality of color sensors (not illustrated). The plurality of color sensors are, for example, sensors that separate and extract light (color components) having different wavelengths. For example, the external light sensor 330 separates light in a human visible range (380 nm to 780 nm in wavelength) into a plurality of light beams for different wavelengths by using the plurality of color sensors. In this manner, the external light sensor 330 performs filter spectroscopic processing to separate and extract light having a predetermined wavelength. The external light sensor 330 outputs the separation result to the information processing apparatus 100 via the communication unit 310, for example.

Note that although a case where the external light sensor 330 performs the spectroscopy by using the plurality of color sensors has been described here, the external light sensor 330 is not limited thereto. The external light sensor 330 may be, for example, a sensor that acquires the spectroscopy of the light source in more detail, such as a spectrometer. In this manner, by using the spectrometer, the light source estimation processing by the information processing apparatus 100 described later can be omitted. However, since the spectrometer is expensive and not common, the external light sensor 330 can be configured more inexpensively and more easily by using the color sensor.

Furthermore, here, the imaging apparatus 300 has the external light sensor 330, but the present disclosure is not limited thereto. It is sufficient that the information related to the photographing-side light source is acquired by the external light sensor 330, and for example, the external light sensor 330 may be disposed independently on the photographing side separately from the imaging apparatus 300.

Figure 3:
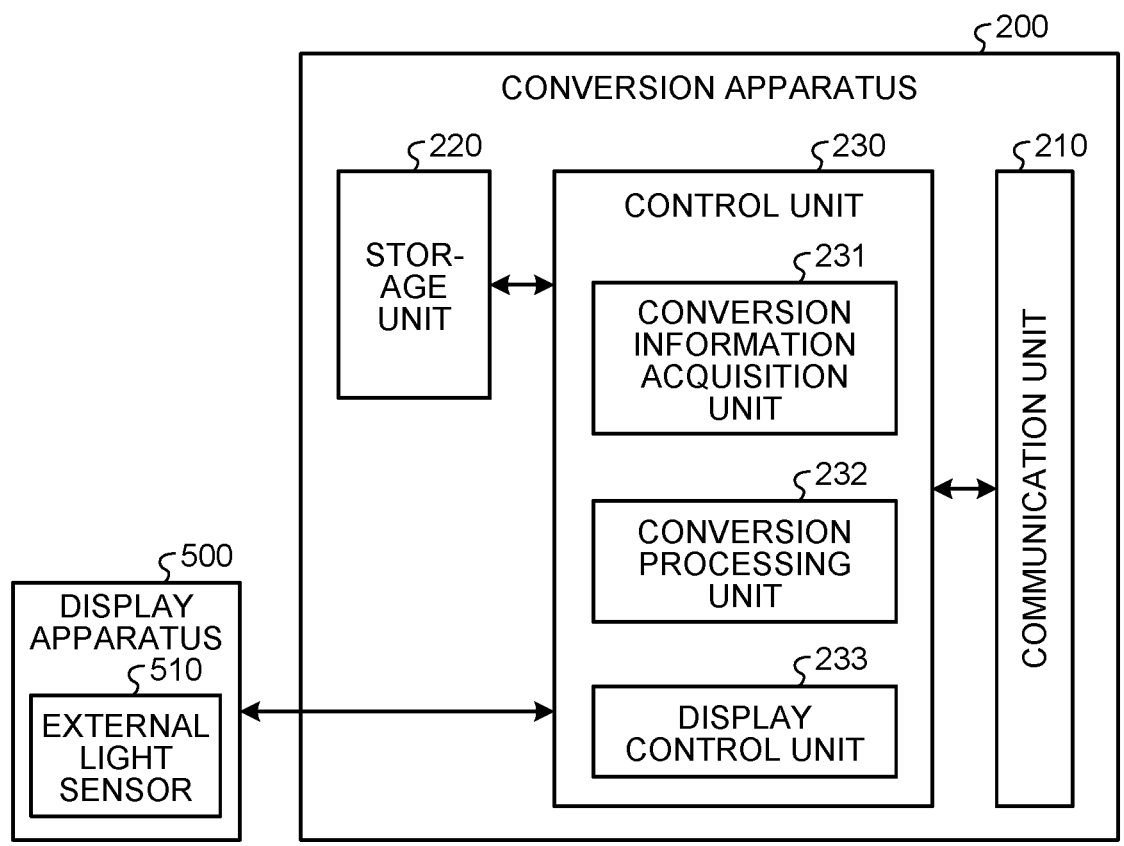
FIG. 3 is a block diagram illustrating a configuration example of a conversion apparatus and a display apparatus according to the embodiment of the present disclosure.

Next, the conversion apparatus 200 and the display apparatus 500 of the information processing system 10 will be described with reference to FIG. 3. FIG. 3 is a block diagram illustrating a configuration example of the conversion apparatus 200 and the display apparatus 500 according to the embodiment of the present disclosure.

[Conversion Apparatus 200]

The conversion apparatus 200 is an information processing apparatus that converts the RGB image acquired by the imaging apparatus 300 into a converted image of the color absolute coordinate XYZ value under the display-side light source and displays the converted image on the display apparatus 500. The conversion apparatus 200 illustrated in FIG. 3 includes a communication unit 210, a storage unit 220, and a control unit 230.

(Communication Unit 210)

The communication unit 210 is a communication interface that communicates with an external apparatus via a network in a wired or wireless manner. The communication unit 210 is realized by, for example, a network interface card (NIC) or the like.

(Storage Unit 220)

The storage unit 220 is a storage apparatus capable of reading and writing data, such as a DRAM, an SRAM, a flash memory, or a hard disk. The storage unit 220 functions as a storage unit of the conversion apparatus 200. The storage unit 220 stores conversion information to be used for conversion processing performed by the control unit 230 described later.

(Control Unit 230)

The control unit 230 controls each unit of the conversion apparatus 200. The control unit 230 is realized, for example, by executing a program stored in the conversion apparatus 200 by a central processing unit (CPU), a micro processing unit (MPU), a graphics processing unit (GPU), or the like using a random access memory (RAM) or the like as a work area. Furthermore, the control unit 230 is realized by, for example, an integrated circuit such as an application specific integrated circuit (ASIC), or a field programmable gate array (FPGA).

The control unit 230 includes a conversion information acquisition unit 231, a conversion processing unit 232, and a display control unit 233. Each block (the conversion information acquisition unit 231 to the display control unit 233) constituting the control unit 230 is a functional block indicating a function of the control unit 230. These functional blocks may be software blocks or hardware blocks. For example, each of the functional blocks described above may be one software module realized by software (including microprograms), or may be one circuit block on a semiconductor chip (die). Of course, each functional block may be one processor or one integrated circuit. The control unit 230 may be configured by a functional unit different from the above-described functional block. A configuration method of the functional block is arbitrary.

Note that the control unit 230 may be configured by a functional unit different from the above-described functional block. In addition, some or all of the operations of the blocks (the conversion information acquisition unit 231 to the display control unit 233) constituting the control unit 230 may be performed by another apparatus. For example, some or all of the operations of the blocks constituting the control unit 230 may be performed by a control apparatus realized by cloud computing.

(Conversion Information Acquisition Unit 231)

The conversion information acquisition unit 231 acquires conversion information from the information processing apparatus 100 via the communication unit 210, and stores the conversion information in, for example, the storage unit 220. The conversion information acquisition unit 231 acquires the conversion information at a predetermined cycle of several seconds, for example. The conversion information is information for converting the RGB image imaged by the imaging apparatus 300 into a converted image of the color absolute coordinate XYZ value under the display-side light source, and is expressed by, for example, a conversion coefficient, a look up table (LUT), or the like.

(Conversion Processing Unit 232)

The conversion processing unit 232 executes conversion processing of converting the RGB image acquired from the imaging apparatus 300 via the communication unit 210 into a converted image of the color absolute coordinate XYZ value by using the conversion information. The conversion processing unit 232 outputs the converted image to the display control unit 233. Note that details of the conversion processing will be described later.

(Display Control Unit 233)

The display control unit 233 controls the display apparatus 500 to display the converted image. In a case where the display apparatus 500 can display an image of the XYZ value, the converted image of the XYZ value generated by the conversion processing unit 232 is output to the display apparatus 500. On the other hand, in a case where the display apparatus 500 cannot display an image of an XYZ value and displays an image of an RGB value, the display control unit 233 converts the converted image of the XYZ value generated by the conversion processing unit 232 into a converted image of the RGB value and outputs the converted image to the display apparatus 500. Note that information for converting the converted image from the XYZ value into the RGB value is assumed to be stored in the storage unit 220 in advance.

[Display Apparatus 500]

The display apparatus 500 is, for example, a display apparatus such as a liquid crystal display (LCD) or an organic electro luminescence (EL) display. The display apparatus 500 displays the converted image output by the conversion apparatus 200. In a case where the conversion apparatus 200 outputs the converted image of the XYZ value, the display apparatus 500 may convert the converted image of the XYZ value into the RGB value and then display the converted image on the display.

(External Light Sensor)

In addition, the display apparatus 500 illustrated in FIG. 3 includes an external light sensor 510. The external light sensor 3510 is an apparatus that acquires information of a display-side light source. The external light sensor 510 has, for example, a plurality of color sensors (not illustrated). The plurality of color sensors are, for example, sensors that separate and extract light (color components) having different wavelengths. For example, the external light sensor 510 separates light in a human visible range (380 nm to 780 nm in wavelength) into a plurality of light beams for different wavelengths by using the plurality of color sensors. In this manner, the external light sensor 510 performs filter spectroscopic processing to separate and extract light having a predetermined wavelength. The external light sensor 510 outputs the separation result to the information processing apparatus 100.

Note that although a case where the external light sensor 510 performs spectroscopy by using a plurality of color sensors has been described here, the external light sensor 510 is not limited thereto. The external light sensor 510 may be, for example, a sensor that acquires the spectroscopy of the light source in more detail, such as a spectrometer. In this manner, by using the spectrometer, the light source estimation processing by the information processing apparatus 100 described later can be omitted. However, since the spectrometer is expensive and not common, the external light sensor 510 can be configured more inexpensively and more easily by using the color sensor.

Furthermore, here, the display apparatus 500 has the external light sensor 510, but the present disclosure is not limited thereto. Information related to the display-side light source may be acquired by the external light sensor 510. For example, the external light sensor 510 may be disposed independently on the display side separately from the display apparatus 500, and in a case where the conversion apparatus 200 is disposed on the display side, the external light sensor 510 may be mounted on the conversion apparatus 200.

[Information Processing Apparatus 100]

Figure 4:
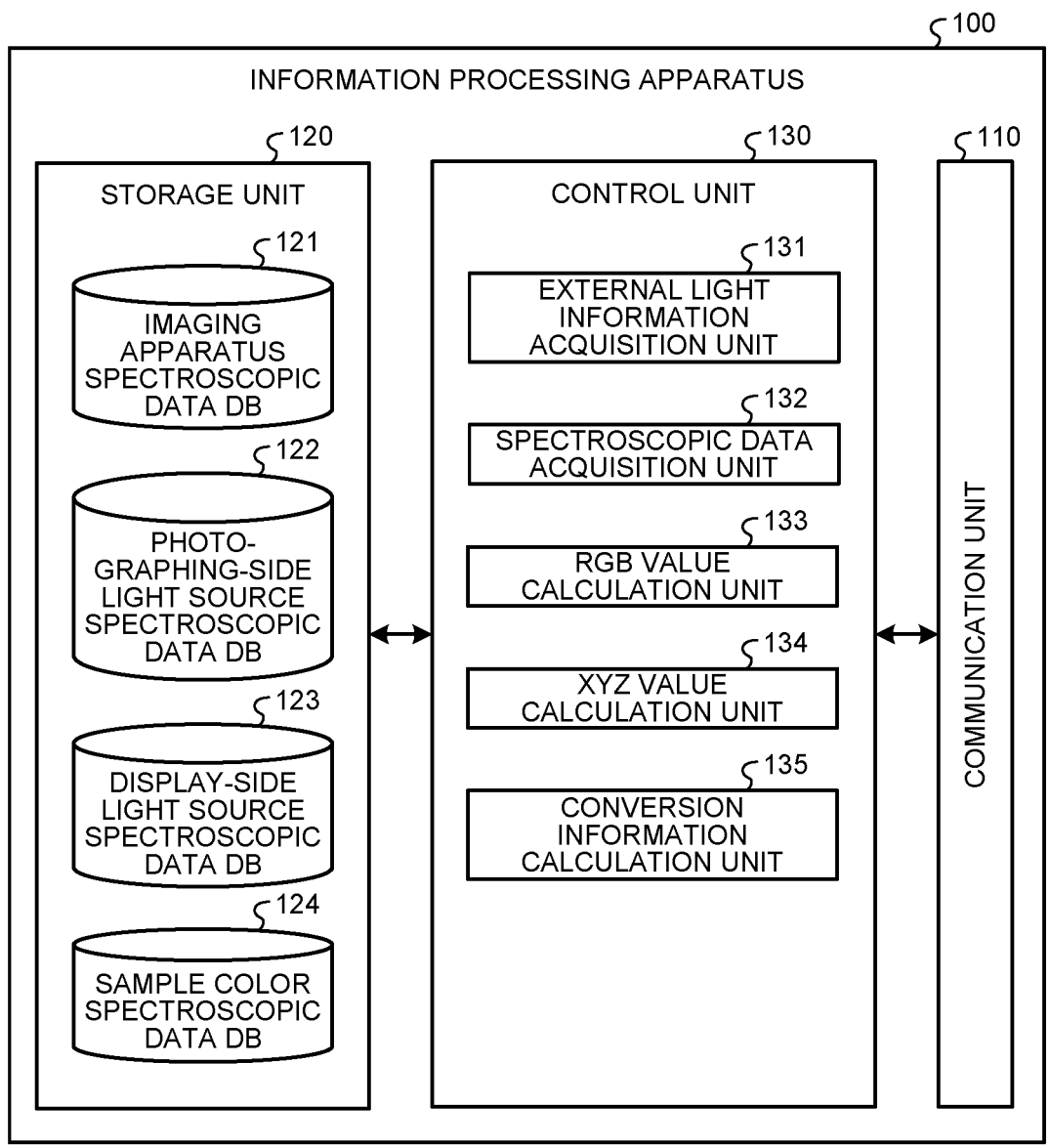
FIG. 4 is a block diagram illustrating a configuration example of an information processing apparatus according to the embodiment of the present disclosure.

Next, FIG. 4 is a block diagram illustrating a configuration example of the information processing apparatus 100 according to the embodiment of the present disclosure. As illustrated in FIG. 4, the information processing apparatus 100 includes a communication unit 110, a storage unit 120, and a control unit 130.

[Communication Unit 110]

The communication unit 110 is a communication interface that communicates with an external apparatus via a network in a wired or wireless manner. The communication unit 110 is realized by, for example, a network interface card (NIC) or the like.

[Storage Unit 120]

The storage unit 120 is a storage apparatus capable of reading and writing data, such as a DRAM, an SRAM, a flash memory, or a hard disk. The storage unit 120 functions as a storage unit of the information processing apparatus 100. The storage unit 120 has an imaging apparatus spectroscopic data DB 121, a photographing-side light source spectroscopic data DB 122, a display-side light source spectroscopic data DB 123, and a sample color spectroscopic data DB 124.

(Imaging Apparatus Spectroscopic Data DB 121)

The imaging apparatus spectroscopic data DB 121 holds characteristic data related to the spectroscopic sensitivity characteristic of the imaging apparatus 300. The imaging apparatus spectroscopic data DB 121 holds, for example, characteristic data of a plurality of the imaging apparatuses 300. The information processing apparatus 100 acquires the characteristic data of the imaging apparatus 300 actually mounted on the information processing system 10 from the imaging apparatus spectroscopic data DB 121.

At this time, the imaging apparatus spectroscopic data DB 121 desirably comprehensively holds the characteristic data of all the imaging apparatuses 300 that can be employed in the information processing system 10.

Note that, in a case where the imaging apparatus 300 mounted on the information processing system 10 is determined in advance, the imaging apparatus spectroscopic data DB 121 may hold characteristic data of the imaging apparatus 300 determined in advance.

(Photographing-Side Light Source Spectroscopic Data DB 122)

The photographing-side light source spectroscopic data DB 122 holds photographing-side (imaging-side) spectroscopic data related to a spectroscopic distribution characteristic of the photographing-side light source. The photographing-side light source spectroscopic data DB 122 holds, for example, photographing-side spectroscopic data of a plurality of photographing-side illumination apparatuses 600A. At this time, the photographing-side light source spectroscopic data DB 122 desirably comprehensively holds spectroscopic data of a light source that can be a photographing-side light source, such as an incandescent lamp, a fluorescent lamp, an LED, or sunlight.

(Display-Side Light Source Spectroscopic Data DB 123)

The display-side light source spectroscopic data DB 123 holds display-side (observation side) spectroscopic data related to a spectroscopic distribution characteristic of the display-side light source. The display-side light source spectroscopic data DB 123 holds, for example, photographing-side spectroscopic data of a plurality of display-side illumination apparatuses 600B. At this time, the display-side light source spectroscopic data DB 123 desirably comprehensively holds spectroscopic data of a light source that can be a display-side light source, such as an incandescent lamp, a fluorescent lamp, an LED, or sunlight.

In FIG. 4, the light source spectroscopic data DB is divided between the photographing side and the display side, but the present disclosure is not limited thereto. For example, in a case where spectroscopic data related to the same light source is held on the photographing side and the display side, the photographing-side light source spectroscopic data DB 122 and the display-side light source spectroscopic data DB 123 may be configured as one DB.

(Sample Color Spectroscopic Data DB 124)

The sample color spectroscopic data DB 124 holds color spectroscopic data related to a spectroscopic reflectance characteristic of a sample color. The color spectroscopic data includes, for example, a spectroscopic reflectance for each of a plurality of sample colors included in a color sample (color sample).

As will be described later, an RGB value and an XYZ value are calculated based on the sample color. Therefore, the sample color included in the color spectroscopic data desirably covers the color gamut required in the conversion processing from the RGB value into the XYZ value. That is, the color spectroscopic data desirably includes a large number of spectroscopic reflectance data covering the color gamut necessary for the conversion processing.

The sample color spectroscopic data DB 124 may hold color spectroscopic data for each of a plurality of color samples (color samples) according to, for example, a type of the subject 400. For example, the sample color spectroscopic data DB 124 holds color spectroscopic data for each representative object in nature based on printing color samples of about 1000 to 2000 colors.

At this time, the sample color spectroscopic data DB 124 may hold color spectroscopic data of the sample colors that are dense in the vicinity of the color of which color reproduction accuracy is to be improved, that is, the number of samples is large in the vicinity of the color of which color reproduction accuracy is to be improved. That is, the sample color included in the color spectroscopic data may be a different color for each corresponding object. As a result, the information processing apparatus 100 can further improve the color reproduction accuracy and control the deviation of the color reproduction accuracy due to the sample color for each object to some extent.

Note that the spectroscopic reflectance included in the color spectroscopic data may be an actual spectroscopic reflectance of the object, or may be an imaginary spectroscopic reflectance (estimated spectroscopic reflectance) created (estimated) as data based on the actual spectroscopic reflectance.

[Control Unit 130]

The control unit 130 controls each unit of the information processing apparatus 100. The control unit 130 is realized, for example, by executing a program stored in the information processing apparatus 100 by a central processing unit (CPU), a micro processing unit (MPU), a graphics processing unit (GPU), or the like using a random access memory (RAM) or the like as a work area. Furthermore, the control unit 130 may be realized by, for example, an integrated circuit such as an application specific integrated circuit (ASIC) and a field programmable gate array (FPGA).

The control unit 130 includes an external light information acquisition unit 131, a spectroscopic data acquisition unit 132, an RGB value calculation unit 133, an XYZ value calculation unit 134, and a conversion information calculation unit 135. Each block (the external light information acquisition unit 131 to the conversion information calculation unit 135) constituting the control unit 130 is a functional block indicating a function of the control unit 130. These functional blocks may be software blocks or hardware blocks. For example, each of the functional blocks described above may be one software module realized by software (including microprograms), or may be one circuit block on a semiconductor chip (die). Of course, each functional block may be one processor or one integrated circuit. The control unit 130 may be configured by a functional unit different from the above-described functional block. A configuration method of the functional block is arbitrary.

Note that the control unit 130 may be configured by a functional unit different from the above-described functional block. In addition, some or all of the operations of the blocks (the external light information acquisition unit 131 to the conversion information calculation unit 135) constituting the control unit 130 may be performed by another apparatus. For example, some or all of the operations of the blocks constituting the control unit 130 may be performed by a control apparatus realized by cloud computing.

(External Light Information Acquisition Unit 131)

The external light information acquisition unit 131 acquires photographing-side external light information from the external light sensor 330 of the imaging apparatus 300 via the communication unit 110. The external light information acquisition unit 131 acquires display-side external light information from the external light sensor 510 of the display apparatus 500 via the communication unit 110. The external light information acquisition unit 131 outputs the acquired photographing-side external light information and display-side external light information to the spectroscopic data acquisition unit 132.

(Spectroscopic Data Acquisition Unit 132)

The spectroscopic data acquisition unit 132 acquires photographing-side spectroscopic data from the photographing-side light source spectroscopic data DB 122 based on the photographing-side external light information acquired from the external light information acquisition unit 131. The spectroscopic data acquisition unit 132 acquires display-side spectroscopic data from the display-side light source spectroscopic data DB 123 based on the display-side external light information acquired from the external light information acquisition unit 131. Details of a method of acquiring the photographing-side spectroscopic data and the display-side spectroscopic data by the spectroscopic data acquisition unit 132 will be described later with reference to FIG. 5.

(RGB Value Calculation Unit 133)

The RGB value calculation unit 133 calculates an RGB value output by the imaging apparatus 300 under the photographing-side light source for each sample color based on the characteristic data of the imaging apparatus 300, the photographing-side spectroscopic data, and the color spectroscopic data of the sample color.

Note that the RGB value calculation unit 133 acquires the characteristic data of the imaging apparatus 300 from the imaging apparatus spectroscopic data DB 121 according to the imaging apparatus 300 that actually performs imaging. The RGB value calculation unit 133 acquires the photographing-side spectroscopic data from the spectroscopic data acquisition unit 132. The RGB value calculation unit 133 acquires, for example, color spectroscopic data corresponding to the type of the subject 400 from the sample color spectroscopic data DB 124.

In this manner, the RGB value calculation unit 133 calculates the RGB value by switching the characteristic data according to the imaging apparatus 300. Further, the RGB value calculation unit 133 calculates the RGB value by switching the color spectroscopic data according to the subject 400.

The RGB value calculation unit 133 outputs the calculated RGB value to the conversion information calculation unit 135.

(XYZ Value Calculation Unit 134)

The XYZ value calculation unit 134 calculates an XYZ value under the display-side light source for each sample color based on the display-side spectroscopic data and the color spectroscopic data of the sample color.

The XYZ value calculation unit 134 acquires, for example, color spectroscopic data corresponding to the type of the subject 400 from the sample color spectroscopic data DB 124. Thus, the XYZ value calculation unit 134 calculates the XYZ value by switching the color spectroscopic data according to the subject 400.

The XYZ value calculation unit 134 outputs the calculated XYZ value to the conversion information calculation unit 135.

(Conversion Information Calculation Unit 135)

The conversion information calculation unit 135 calculates conversion information by using the RGB value calculated by the RGB value calculation unit 133 and the XYZ value calculated by the XYZ value calculation unit 134. The conversion information is, for example, information for associating the RGB value with the XYZ value for each sample color included in the color sample. Details of the conversion information and the calculation processing of the conversion information will be described later.

The conversion information calculation unit 135 calculates (updates) the conversion information at a predetermined cycle (several seconds), for example. The conversion information calculation unit 135 outputs the conversion information to the conversion apparatus 200 via the communication unit 110.

[Details of Spectroscopic Data Acquisition Unit 132]

Figure 5:
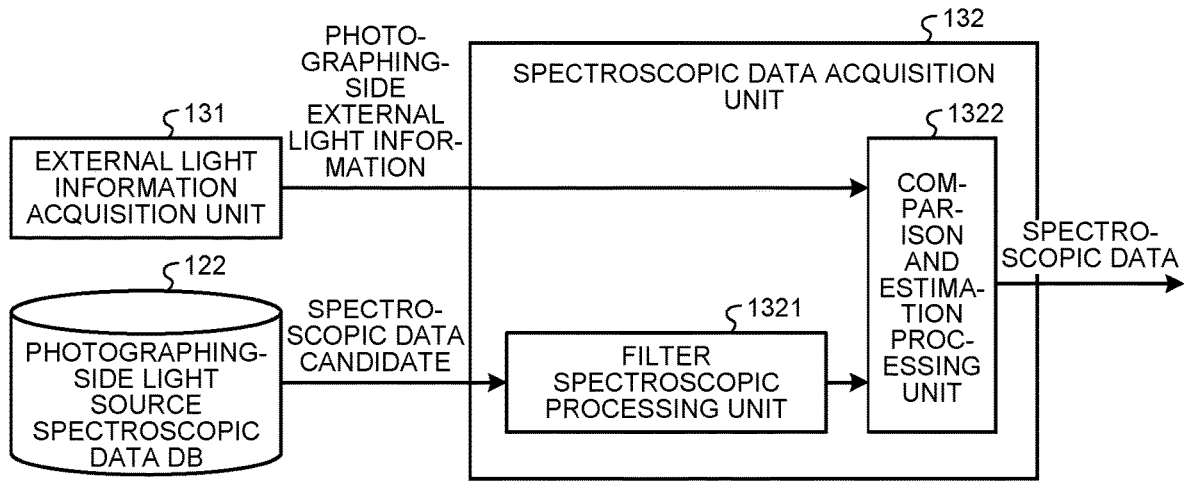
FIG. 5 is a diagram illustrating a configuration example of a spectroscopic data acquisition unit according to the embodiment of the present disclosure.

Next, a detailed configuration example of the spectroscopic data acquisition unit 132 will be described with reference to FIG. 5. FIG. 5 is a diagram illustrating a configuration example of the spectroscopic data acquisition unit 132 according to the embodiment of the present disclosure. Note that, in FIG. 5, a case where the spectroscopic data acquisition unit 132 estimates the photographing-side light source will be described, but the spectroscopic data acquisition unit 132 similarly estimates the display-side light source.

The spectroscopic data acquisition unit 132 illustrated in FIG. 5 includes a filter spectroscopic processing unit 1321 and a comparison and estimation processing unit 1322.

The filter spectroscopic processing unit 1321 acquires spectroscopic data of a plurality of light sources held by the photographing-side spectroscopic data DB as a plurality of spectroscopic data candidates. The filter spectroscopic processing unit 1321 extracts light having the same wavelength as the light (color component) extracted by the external light sensor 330 from the spectroscopic data candidates. That is, the filter spectroscopic processing unit 1321 performs the same filter spectroscopic processing as that of the external light sensor 330 on the spectroscopic data candidates, and outputs the processing result to the comparison and estimation processing unit 1322. Note that the filter spectroscopic processing unit 1321 performs the same filter spectroscopic processing as that of the external light sensor 330, for example, by operation.

The comparison and estimation processing unit 1322 compares the filter spectroscopic processing results for the plurality of spectroscopic data candidates with the photographing-side external light information acquired by the external light information acquisition unit 131. When a type (for example, a fluorescent lamp, an LED, an incandescent lamp, or the like) of the light source is generally determined, a spectroscopic shape is substantially determined. Therefore, when the light sources are the same, the result of the filter spectroscopic processing on the spectroscopic data of the light source is theoretically the same as the result of the filter spectroscopic processing on the actual light source.

Therefore, the comparison and estimation processing unit 1322 compares the filter spectroscopic processing results for the plurality of spectroscopic data candidates with the photographing-side external light information including the filter spectroscopic processing result for the actual light source.

The comparison and estimation processing unit 1322 estimates that a spectroscopic data candidate corresponding to the filter spectroscopic processing result closest to the filter spectroscopic processing result for the actual light source is the photographing-side spectroscopic data, and estimates that the light source corresponding to the photographing-side spectroscopic data is the actual light source.

The comparison and estimation processing unit 1322 compares the two filter spectroscopic processing results by calculating how much the filter spectroscopic processing result for the spectroscopic data candidate corresponds to the filter spectroscopic processing result for the actual light source by using a method such as regression analysis, for example.

The comparison and estimation processing unit 1322 outputs the estimated spectroscopic data candidate of the light source to the RGB value calculation unit 133 as the photographing-side spectroscopic data.

[Example of Conversion Information]

(Conversion Coefficient)

Figure 6:
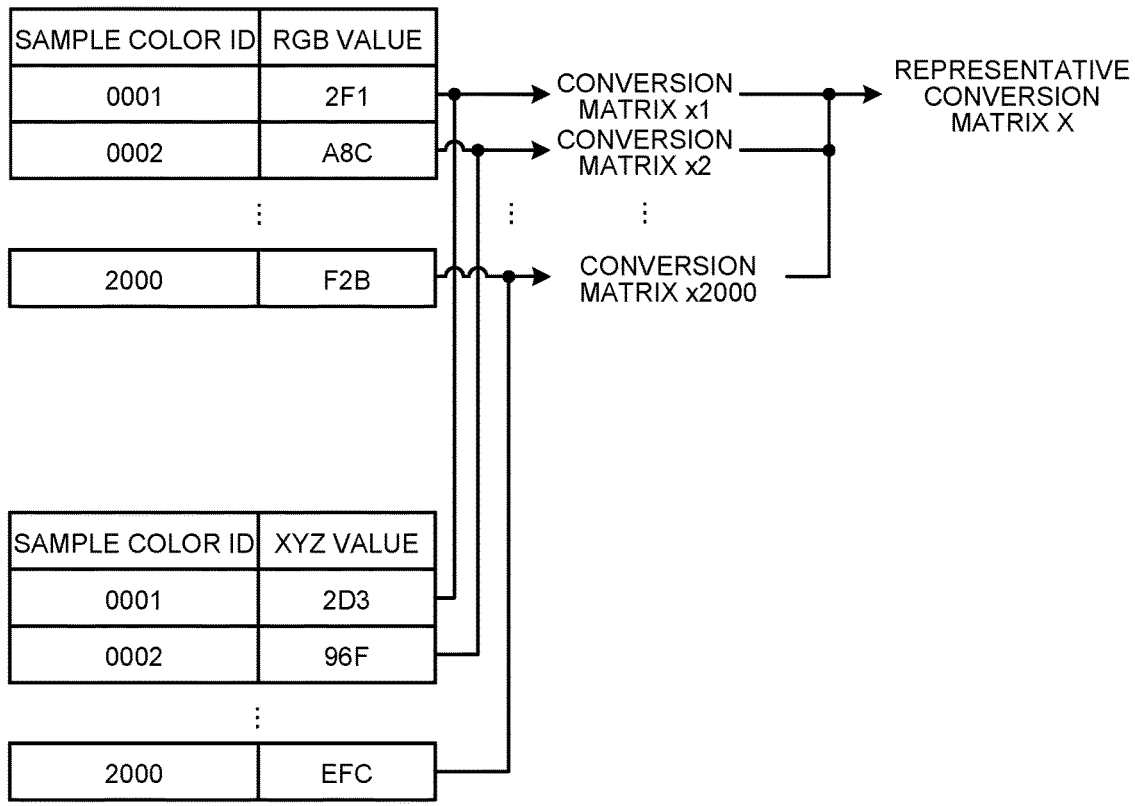
FIG. 6 is a diagram for describing an example of conversion information according to the embodiment of the present disclosure.

Next, an example of conversion information according to the embodiment of the present disclosure will be described with reference to FIG. 6. FIG. 6 is a diagram for describing an example of conversion information according to the embodiment of the present disclosure. As described above, the conversion information is calculated by the conversion information calculation unit 135 (see FIG. 4).

In the example illustrated in FIG. 6, the conversion information calculation unit 135 mathematically calculates a color coordinate conversion coefficient as the conversion information by comparing the RGB value acquired from the RGB value calculation unit 133 with the XYZ value acquired from the XYZ value calculation unit 134.

As described above, the RGB value calculation unit 133 calculates an RGB value for each sample color. In FIG. 6, sample colors, sample color IDs, and the 4-bit RGB value are illustrated in association with one another. The XYZ value calculation unit 134 calculates the XYZ value for each sample color. In FIG. 6, the sample color ID for identifying a sample color and 4-bit RGB value are illustrated in association with each other.

The conversion information calculation unit 135 compares the RGB value having the same sample color ID with the XYZ value, and calculates a conversion coefficient for converting the RGB value into the XYZ value. For example, when conversion from the RGB value into the XYZ value is performed by matrix operation, a conversion matrix for converting the RGB value into the XYZ value is calculated.

For example, in the example of FIG. 6, the conversion information calculation unit 135 calculates a conversion matrix x1 for converting an RGB value "2F1" with a sample color ID of "0001" into an XYZ value "2D3". The conversion matrix x1 is, for example, a 3×3 matrix.

Similarly, the conversion information calculation unit 135 calculates conversion matrices x2 to x2000 corresponding to the sample color IDs "0002" to "2000". As described above, the conversion information calculation unit 135 calculates, for example, the conversion matrix x corresponding to all the sample colors included in the color sample (color sample).

The conversion matrix x calculated by the conversion information calculation unit 135 is different for each sample color. Therefore, the conversion information calculation unit 135 calculates, as the conversion information, a representative conversion matrix X that can average express the conversion from the RGB value into the XYZ value in all sample colors by using, for example, a least squares method or the like, and outputs the representative conversion matrix X to the conversion apparatus 200. As a result, the conversion apparatus 200 can convert the RGB image into the converted image by simple matrix operation, and the operation amount of the conversion processing can be reduced. As a result, for example, the conversion apparatus 200 can be configured by simple hardware.

On the other hand, when all colors are converted by one representative conversion matrix X, variation in the conversion accuracy occurs depending on the color. As a method of suppressing such variation, a method can be considered in which the conversion apparatus 200 performs conversion processing by using the conversion matrix x calculated for each sample color ID. In other words, the conversion information calculation unit 135 generates the conversion information by using all the conversion matrices x as the representative conversion matrix X. However, in a case of this method, there is a concern that the hardware configuration of the conversion apparatus 200 is complicated.

As described above, when the number of representative conversion matrices increases, the processing amount of the conversion processing increases, and thus, the number of representative conversion matrices included in the conversion information can be appropriately set according to, for example, a configuration of the conversion apparatus 200, a required processing time, a required conversion accuracy, and the like.

Note that even in a case of calculating a plurality of representative conversion matrices (coefficients), the conversion information calculation unit 135 sets some points according to color, luminance, or the like, and calculates the representative conversion matrix (coefficient) for each set point, instead of calculating the representative conversion matrix (coefficient) for each pixel. That is, the conversion information calculation unit 135 divides the sample color into a plurality of groups according to color, luminance, and the like, for example, and calculates the representative conversion matrix for each group.

In this case, the conversion apparatus 200 selects a representative conversion matrix according to each pixel value of the RGB image, and performs conversion processing for each pixel. At this time, the conversion apparatus 200 may perform correction on the representative conversion matrix, such as weighting the representative conversion matrix selected according to the pixel value.

(Conversion Table)

Note that the conversion information calculated by the conversion information calculation unit 135 is not limited to the conversion matrix (conversion coefficient). For example, the conversion information calculation unit 135 may calculate a conversion table as the conversion information.

Figures 7, 8:
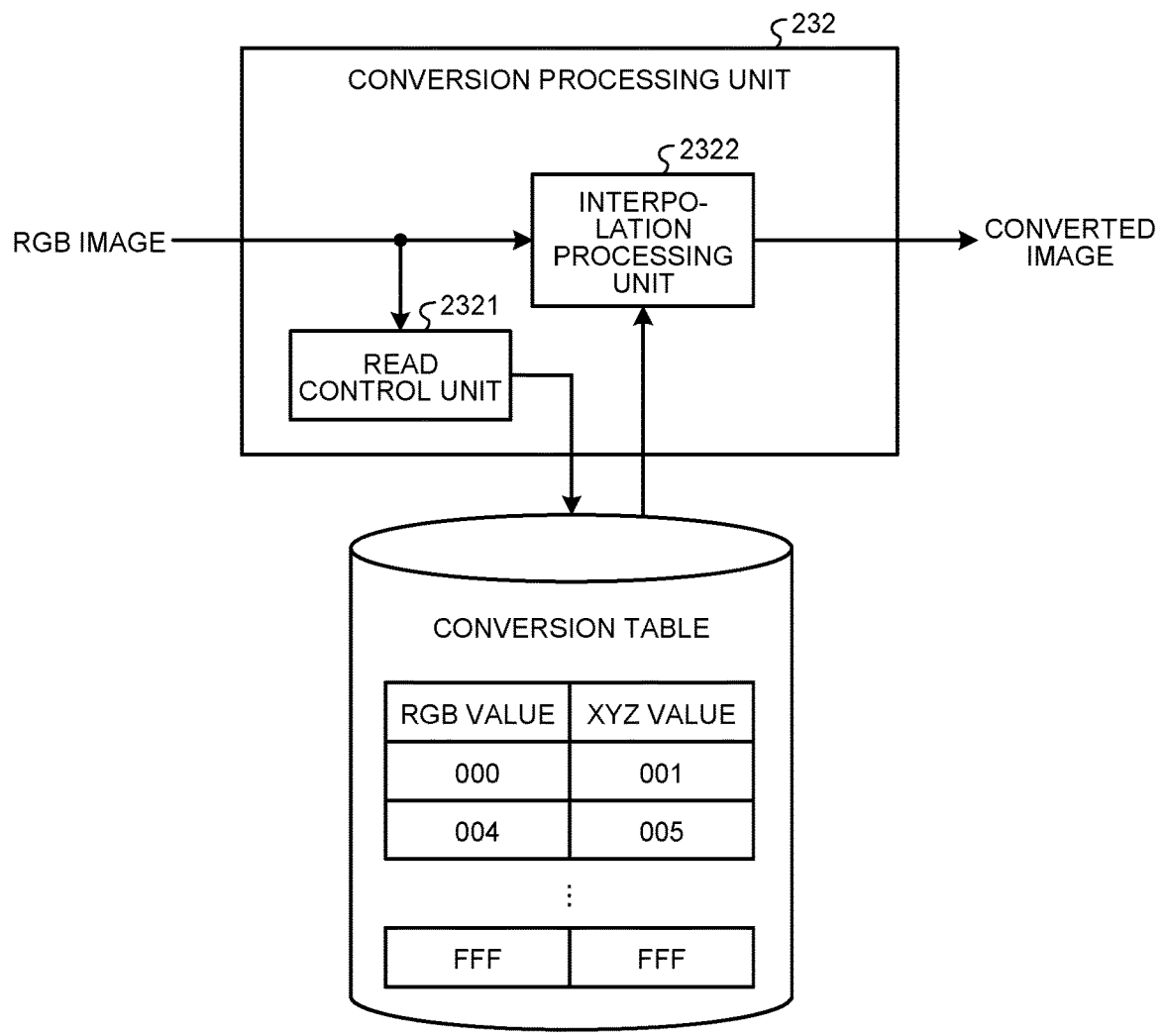
FIG. 7 is a diagram illustrating an example of conversion information calculated by a conversion information calculation unit according to the embodiment of the present disclosure.
FIG. 8 is a diagram for describing an example of conversion processing by the conversion apparatus according to the embodiment of the present disclosure.

FIG. 7 is a diagram illustrating an example of conversion information calculated by the conversion information calculation unit 135 according to the embodiment of the present disclosure. As illustrated in FIG. 7, the conversion information calculation unit 135 calculates a conversion table in which 4-bit RGB value and 4-bit XYZ value are associated with each sample color as the conversion information.

Note that the conversion information calculation unit 135 may calculate a conversion table in which the RGB value and the XYZ value are associated with each other in all sample colors, or may calculate a conversion table in which the RGB value and the XYZ value are discretely associated with each other in some sample colors. Note that the number of sample colors included in the conversion table can be appropriately set according to, for example, the configuration of the conversion apparatus 200, the required processing time, the required conversion accuracy, and the like.

[Example of Conversion Processing]

Here, an example of conversion processing executed by the conversion apparatus 200 in a case where the conversion information is the above-described conversion table will be described with reference to FIG. 8. FIG. 8 is a diagram for describing an example of conversion processing by the conversion apparatus 200 according to the embodiment of the present disclosure. Note that the conversion processing is executed by the conversion processing unit 232 of the conversion apparatus 200. In addition, it is assumed that the conversion table is acquired from the information processing apparatus 100 by the conversion information acquisition unit 231 (see FIG. 3) and stored in the storage unit 220 (see FIG. 3).

As illustrated in FIG. 8, the conversion processing unit 232 includes a read control unit 2321 and an interpolation processing unit 2322.

The read control unit 2321 controls read processing of the conversion table according to each pixel value of the RGB image. In a case where there is an RGB value that is the same as the pixel value, the read control unit 2331 performs read processing of the conversion table so as to output an XYZ value corresponding to the RGB value.

On the other hand, in a case where there is no RGB value that is the same as the pixel value, the read control unit 2331 performs read processing of the conversion table so as to output an XYZ value corresponding to the RGB value close to the pixel value. In this case, one or a plurality of (for example, two) XYZ values may be output.

The interpolation processing unit 2322 performs interpolation processing by using the XYZ value output by the read control unit 2321, converts the pixel value of the RGB image into the XYZ value, and generates a converted image.

Note that, in a case where the interpolation processing is not required, that is, in a case where the RGB value the same as the pixel value is in the conversion table, the interpolation processing unit 2322 does not perform the interpolation processing, for example, and generates a converted image by using the XYZ value corresponding to the RGB value as the pixel value.

For example, it is assumed that a pixel value of a predetermined pixel of an RGB image is "004". In this case, as illustrated in FIG. 8, the same RGB value is included in the conversion table. Therefore, the read control unit 2321 performs read processing so as to output an XYZ value "005" corresponding to the RGB value "004". The interpolation processing unit 2322 generates a converted image in which the read XYZ value "005" is set as the pixel value of the predetermined pixel.

On the other hand, in a case where there is no RGB value corresponding to the pixel value of the RGB image, the interpolation processing unit 2322 performs interpolation processing on the output XYZ value to generate a converted image.

For example, it is assumed that a pixel value of a predetermined pixel of an RGB image is "002". As illustrated in FIG. 8, the same RGB value is not included in the conversion table. In this case, for example, the read control unit 2321 performs read processing so as to output the XYZ value "001" corresponding to an RGB value "000" and the XYZ value "005" corresponding to the RGB value "004". The interpolation processing unit 2322 sets the XYZ values calculated by performing the interpolation processing based on the read XYZ values "001" and "005" as the pixel values of the predetermined pixels.

In this manner, the conversion processing unit 232 generates a converted image obtained by converting each pixel value into an XYZ value by referring to the conversion table for each pixel of the RGB image and performing interpolation processing as necessary.

3. Information Processing

[3.1. Conversion Information Calculation Processing]

Figure 9:
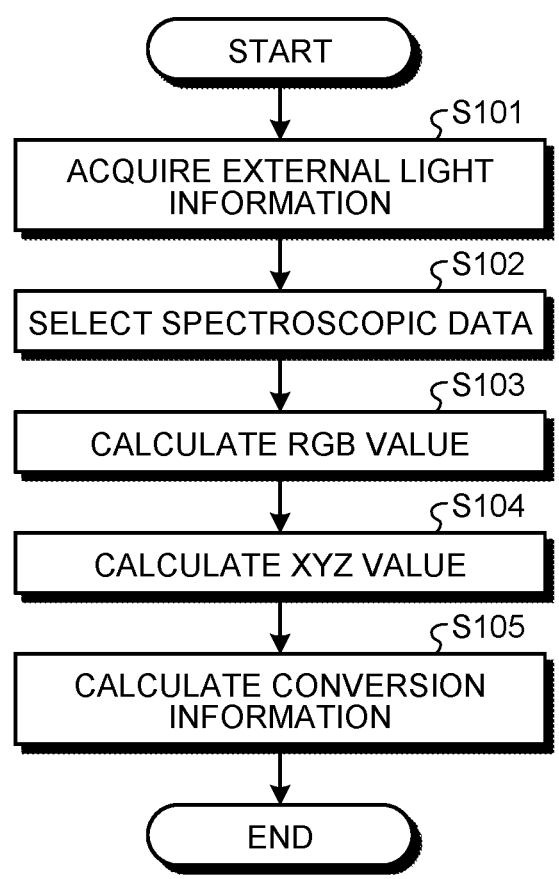
FIG. 9 is a flowchart illustrating a flow of an example of information processing executed by the information processing apparatus according to the embodiment of the present disclosure.

Next, information processing executed by the information processing apparatus 100 according to the embodiment of the present disclosure will be described. FIG. 9 is a flowchart illustrating a flow of an example of information processing executed by the information processing apparatus 100 according to the embodiment of the present disclosure.

The information processing apparatus 100 executes conversion information calculation processing for calculating conversion information as the information processing. The information processing apparatus 100 executes the conversion information calculation processing at a predetermined cycle, for example.

As illustrated in FIG. 9, the information processing apparatus 100 acquires external light information (step S101). The information processing apparatus 100 acquires photographing-side external light information from the external light sensor 330, and acquires display-side external light information from the external light sensor 510.

Next, the information processing apparatus 100 selects spectroscopic data (step S102). The information processing apparatus 100 selects photographing-side spectroscopic data corresponding to the photographing-side light source from the photographing-side light source spectroscopic data DB 122 based on the photographing-side external light information. In addition, the information processing apparatus 100 selects display-side spectroscopic data corresponding to the display-side light source from the display-side light source spectroscopic data DB 123 based on the display-side external light information.

The information processing apparatus 100 calculates an RGB value (step S103). The information processing apparatus 100 calculates the RGB value for each of a plurality of sample colors based on the characteristic data, the photographing-side spectroscopic data, and the color spectroscopic data of the imaging apparatus 300.

The information processing apparatus 100 calculates an XYZ value (step S104). The information processing apparatus 100 calculates the XYZ value for each of a plurality of sample colors based on the display-side spectroscopic data and the color spectroscopic data.

The information processing apparatus 100 calculates conversion information based on the RGB value and the XYZ value (step S105). The conversion information is information used for conversion processing from the RGB value into the XYZ value executed by the conversion apparatus 200, and includes, for example, a conversion coefficient such as a conversion matrix, a conversion table, and the like.

<3.2. Conversion Processing>

Figure 10:
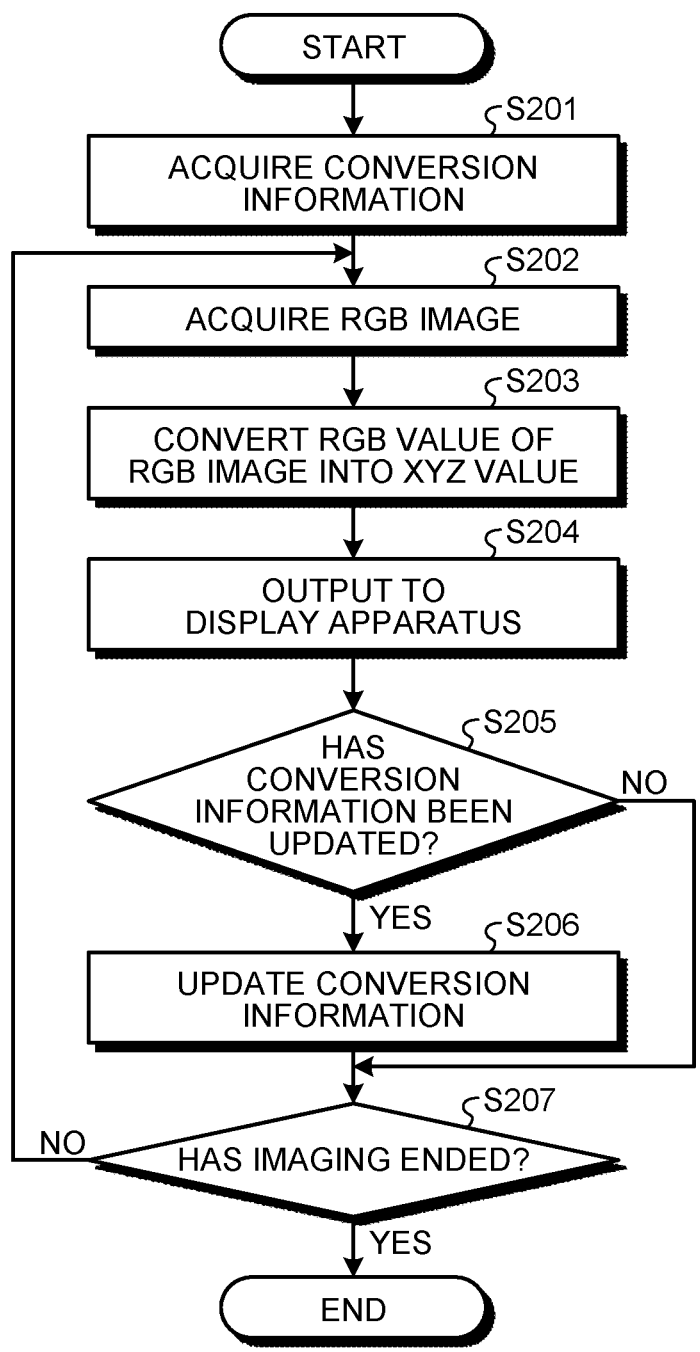
FIG. 10 is a flowchart illustrating a flow of an example of conversion processing executed by the conversion apparatus according to the embodiment of the present disclosure.

Next, conversion processing performed by the conversion apparatus 200 will be described. FIG. 10 is a flowchart illustrating a flow of an example of conversion processing executed by the conversion apparatus 200 according to the embodiment of the present disclosure. The conversion apparatus 200 executes the conversion processing while the imaging apparatus 300 is performing imaging.

First, the conversion apparatus 200 acquires conversion information from the information processing apparatus 100 (step S201). The conversion apparatus 200 may acquire the conversion information before the imaging apparatus 300 starts imaging.

Next, the conversion apparatus 200 acquires an RGB image from the imaging apparatus 300 (step S202). The conversion apparatus 200 converts an RGB value into an XYZ value in each pixel of the acquired RGB image (step S203). The conversion apparatus 200 calculates a pixel value of the XYZ value by multiplying each pixel value of the RGB image by a conversion coefficient. The conversion coefficient is included in, for example, the conversion information.

The conversion apparatus 200 outputs a converted image generated in step S203 to the display apparatus 500 (step S204). As a result, the converted image is displayed on the display apparatus 500.

Subsequently, the conversion apparatus 200 determines whether the conversion information has been updated (step S205). For example, the conversion apparatus 200 determines whether the conversion information has been updated according to whether the conversion information has been acquired from the information processing apparatus 100. Alternatively, the conversion apparatus 200 may determine whether the conversion information has been updated according to whether a predetermined period has elapsed.

When it is determined that the conversion information has been updated (step S205; Yes), the conversion apparatus 200 updates change information stored in the storage unit 220 (step S206).

On the other hand, when it is determined that the conversion information has not been updated (step S205; No), the conversion apparatus 200 determines whether the imaging of the imaging apparatus 300 has ended (step S207). For example, in a case where a notification of imaging end is received from the imaging apparatus 300 or in a case where communication with the imaging apparatus 300 ends, the conversion apparatus 200 determines that imaging has ended.

When it is determined that the imaging has not ended (step S207; No), the processing returns to step S202. On the other hand, when it is determined that the imaging has ended (step S207; Yes), the processing ends.

As described above, in the information processing system 10 according to the present embodiment, the information processing apparatus 100 calculates the RGB value in a case where the sample color is imaged by the imaging apparatus 300 under the photographing-side light source. In addition, the information processing apparatus 100 calculates the XYZ value in a case where the sample color is displayed on the display apparatus 500 under the display-side light source. The information processing apparatus 100 calculates conversion information for converting the calculated RGB value into the XYZ value. The conversion apparatus 200 converts the RGB image imaged by the imaging apparatus 300 into a converted image of the XYZ value by using the conversion information, and displays the converted image on the display apparatus 500. As a result, the information processing system 10 can hold the color coordinates from photographing to display. Therefore, the information processing system 10 can more easily reproduce the color of the subject 400 on the photographing side on the display apparatus 500 (monitor).

Furthermore, the information processing system 10 according to the present embodiment is provided with the external light sensors 330 and 510 on the photographing side and the display side, estimates the spectroscopy of the light source, and acquires spectroscopic data. Therefore, the observer can visually recognize the subject 400 displayed on the display apparatus 500 without being conscious of the spectroscopy of the light source, the change in the light source, and the like.

Furthermore, the information processing system 10 according to the present embodiment only needs to update the conversion information in a case where the spectroscopy of the light source changes, and for example, only needs to update the conversion information every several seconds. As described above, since a processing load due to the calculation of the conversion information is low, the information processing apparatus 100 can be realized by software.

Furthermore, the information processing system 10 according to the present embodiment calculates the conversion information based on the sample color. Therefore, the operation for each pixel can be further reduced as compared with a case where the conversion information is calculated for each pixel imaged by the imaging apparatus 300. As a result, the performance of the hardware required for constructing the information processing system 10 can be further reduced.

Furthermore, in the information processing system 10 according to the present embodiment, the information processing apparatus 100 is realized by, for example, cloud computing, and the conversion apparatus 200 is disposed on the display side. Therefore, the imaging apparatus 300 and the display apparatus 500 can be easily coupled via an existing network such as the Internet. As described above, the information processing system 10 can be easily applied to a system that confirms a photographed image at a remote place. However, as described above, the information processing apparatus 100 calculates the RGB value by using the characteristic data of the imaging apparatus 300. Therefore, in a case where the imaging apparatus 300 is disposed at a place away from the information processing apparatus 100, the display apparatus 300, or the like, the information processing apparatus 100 acquires information related to the imaging apparatus 300, such as model information of the imaging apparatus 300, from the imaging side (for example, the imaging apparatus 300), for example, with metadata or the like.

Note that although a case where the information processing system 10 described above transmits the imaged image from the imaging side to the display side is described, the present disclosure is not limited thereto. For example, even in a case where the information processing system 10 includes the imaging apparatus on the display side and the display apparatus on the imaging side and images are bidirectionally transmitted and received, it is possible to more easily reproduce and display the color of the imaged subject.

4. Modifications

<4.1. First Modification>

In the above-described embodiment, the information processing apparatus 100 estimates the light source based on the external light information acquired from the external light sensors 330 and 510, but the present disclosure is not limited thereto. For example, a user who constructs the information processing system 10, an imaging person who performs imaging, or an observer who visually recognizes the converted image on the display apparatus 500 may specify the light source. In this case, the information processing apparatus 100 acquires spectroscopic data of the designated light source from the spectroscopic data DB.

The designated light source may be different from the actual light source. For example, in a case where the actual photographing-side light source is an illumination apparatus, the user (for example, the observer) designates sunlight as the light source on the photographing side, so that the user can confirm the color in a case where the subject 400 is outdoors.

In this way, by making it possible to designate the light source, the information processing system 10 can present, for example, a video in a case where imaging is performed in an environment different from an actual photographing environment to the observer.

Note that, in a case where the observer or the like designates the light source, the external light sensors 330 and 510 may be omitted.

<4.2. Second Modification>

In the above-described embodiment, the information processing apparatus 100 is an apparatus different from the conversion apparatus 200. In this case, for example, the conversion apparatus 200 can be disposed on the same display side as the display apparatus 500. Furthermore, the information processing apparatus 100 can be realized by, for example, cloud computing.

On the other hand, the information processing apparatus 100 and the conversion apparatus 200 may be disposed at the same place. For example, the functions of the information processing apparatus 100 and the conversion apparatus 200 may be realized by one information processing apparatus 700.

Figure 11:
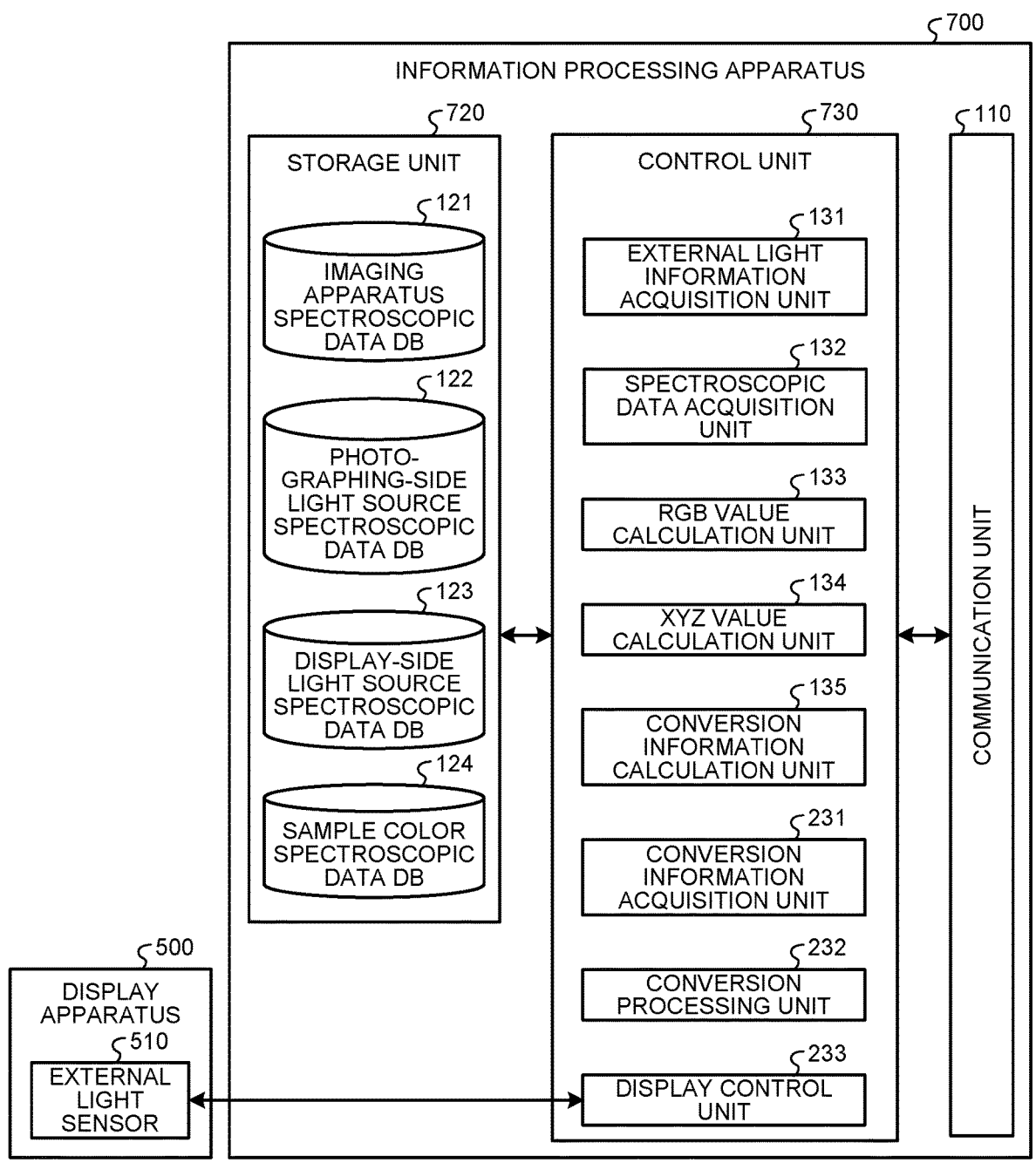
FIG. 11 is a block diagram illustrating a configuration example of an information processing apparatus according to a second modification of the embodiment of the present disclosure.

FIG. 11 is a block diagram illustrating a configuration example of the information processing apparatus 700 according to a second modification of the embodiment of the present disclosure. The information processing apparatus 700 illustrated in FIG. 11 includes a communication unit 110, a storage unit 720, and a control unit 730. Note that among the configurations of the information processing apparatus 700 illustrated in FIG. 11, the same components as those of the information processing apparatus 100 and the conversion apparatus 200 are denoted by the same reference numerals, and description thereof is omitted.

The storage unit 720 holds, for example, each DB held by the storage unit 120 of the information processing apparatus 100 and information held by the storage unit 220 of the conversion apparatus 200.

The control unit 730 has, for example, each function of the control unit 130 of the information processing apparatus 100 and each function of the control unit 230 of the conversion apparatus 200.

In this manner, each function of the information processing apparatus 100 and the conversion apparatus 200 can be realized as one apparatus. For example, by disposing the information processing apparatus 700 on the same display side as the display apparatus 500, it becomes easy to respond to an instruction by the observer such as designation of a light source from the observer (see the first modification).

Note that although FIG. 11 illustrates a case where the information processing apparatus 700 is disposed on the same display side as the display apparatus 500 is illustrated, the present disclosure is not limited thereto. For example, the information processing apparatus 700 may be realized by cloud computing.

<4.3. Third Modification>

In the above-described embodiment and modifications, it has been described that the observer is on the display side, but the present disclosure is not limited thereto. For example, there may be an observer who directly observes the subject 400 on the photographing side as well. Such a case will be described as a third modification.

For example, there is a case where it is desired to simultaneously confirm the color or the like of a prototype manufactured in a factory between a producer in the factory and an orderer in a place away from the factory. In this case, it is desirable to match an actual color of the prototype with a color of the prototype displayed on the display apparatus 500.

As described above, there is a case where it is desired that the color of the subject 400 on the photographing side and the color of the subject 400 displayed on the display apparatus 500 are the same. However, since there is variation in spectroscopic characteristics of humans, even when absolute coordinates of colors are held and displayed as in the information processing system 10 according to the above embodiment, there is a case where a photographing-side observer and a display-side observer determine that the colors are different. It is difficult to correct such variation in the spectroscopic characteristic of the observer, and a mechanism for reducing an influence of the variation in spectroscopic characteristic by a method other than the conversion processing is required.

For example, in a case where colors of two objects are measured by a colorimeter, there is a case where measurement results indicate the same color even when spectroscopic characteristics of the two objects are different (condition color matching pair). Alternatively, even when the spectroscopic characteristics of the two light sources are different, the colorimeter may indicate the same color. The colorimeter imitates the spectroscopic characteristic of human eyes on average, but actual spectroscopic characteristic of the human eyes varies from individual to individual. Therefore, in the condition color matching pair, different observers may not view the same color due to individual variation.

As a method of reducing the influence of the variation, there is a method of aligning the spectroscopic characteristic of the photographing-side light source (photographing-side illumination apparatus 600A) and an all-white spectroscopic characteristic of the display apparatus 500. Here, the all-white spectroscopic characteristic means a spectroscopic characteristic when a white image is displayed on the display apparatus 500.

As described above, by aligning the all-white spectroscopic characteristics of the photographing-side light source and the display apparatus 500, the spectroscopic characteristic viewed by the photographing-side observer has substantially the same shape as the spectroscopic characteristic reproduced by the display apparatus 500. Therefore, it is possible to reduce the influence of the observer variation between the photographing-side observer and the display-side observer.

Assuming that the influence of the observer variation is the condition color matching, the closer the spectroscopic characteristic of the photographing-side light source and the spectroscopic characteristic of the display apparatus 500 are, the smaller the influence of the variation is. For example, by using the same apparatus as the display apparatus 500 as the photographing-side light source, the information processing system 10 having a small influence of the variation can be more easily constructed.

As described above, for example, in a case where the information processing system 10 is constructed including the photographing-side light source, the photographing-side light source is selected in advance so that the spectroscopic characteristic of the photographing-side light source and the all-white spectroscopic characteristic of the display apparatus 500 approach each other, whereby the influence of the observer variation can be reduced.

Note that as a specific method of aligning the spectroscopic characteristic of the photographing-side light source (the photographing-side illumination apparatus 600A) and the all-white spectroscopic characteristic of the display apparatus 500, for example, there is a method of using the same apparatus as the display apparatus 500 as the photographing-side light source. In this case, by displaying white (all white) on the same apparatus as the display apparatus 500, the apparatus can be used as illumination (photographing-side light source).

As described above, by using the same apparatus as the display apparatus 500 as the photographing-side light source, it is possible to more easily construct a system capable of reducing the influence of the observer variation.

Alternatively, for example, the information processing apparatus 100 may acquire information of the display apparatus 500 and present the acquired information to the photographing-side observer. The information processing apparatus 100 presents information related to, for example, a display mounted on the imaging apparatus 300, a display apparatus disposed on the photographing side, and the like. Alternatively, the information processing apparatus 100 may present such information to the photographing-side observer by voice or the like. As a result, the information processing apparatus 100 can urge the photographing-side observer to change the photographing-side light source to a light source having a spectroscopic characteristic close to the all-white spectroscopic characteristic of the display apparatus 500.

The information processing apparatus 100 acquires, for example, identification information for identifying the display apparatus 500, such as a model number, from the display apparatus 500. The information processing apparatus 100 can present the acquired identification information to the photographing-side observer.

Alternatively, the information processing apparatus 100 may present the presentation information acquired by using the identification information to the photographing-side observer. The presentation information may include, for example, at least one of the following information.

Spectroscopic information related to all-white spectroscopic characteristic of display apparatus 500

Product information related to display apparatus 500, such as a product name or a manufacturing company Light source information related to light source having spectroscopic characteristic close to all-white spectroscopic characteristic of display apparatus 500 (for example, information related to illumination apparatus such as fluorescent lamp, incandescent lamp, or LED)

Note that the light source information may include information related to a display apparatus having an all-white spectroscopic characteristic close to an all-white spectroscopic characteristic of the display apparatus 500 in addition to the information related to the illumination apparatus. As described above, by including the information related to the display apparatus other than the display apparatus 500 actually disposed on the display side in the presentation information, the types of the light source that can be selected as the photographing-side light source increase.

For example, the information processing apparatus 100 acquires the presentation information associated with the display apparatus 500 by searching a database constructed in advance. This database may be constructed by, for example, a system administrator, or may be constructed based on information collected from a product home page or the like.

Note that here, the information processing apparatus 100 presents information to the photographing-side observer, but the present disclosure is not limited thereto. For example, the information processing apparatus 100 may present information to the display-side observer, or may present information to both the display-side observer and the photographing-side observer. For example, in a case where there is no apparatus that presents information on the photographing side, or the like, the information processing apparatus 100 may display such information on the display apparatus 500. In this case, for example, the display-side observer who has received the presentation of the information can change the photographing-side light source by notifying the photographing-side observer of the information.

Furthermore, here, the photographing-side light source is changed in accordance with the all-white spectroscopic characteristic of the display apparatus 500, but the present disclosure is not limited thereto. For example, the display apparatus 500 may be changed in accordance with the spectroscopic characteristic of the photographing-side light source. For example, the display apparatus 500 may be changed to the same display that can be prepared on the photographing side. In this case, the information processing apparatus 100 presents information related to the photographing-side light source to the display-side observer.

Alternatively, the information processing apparatus 100 may present both the information related to the display apparatus 500 and the information related to the photographing-side light source to both the display side and the photographing-side observers. In this case, the information processing apparatus 100 can urge the observer to change at least one of the photographing-side apparatus and the display-side apparatus (the display apparatus or the illumination apparatus).

<4.4. Fourth Modification>

In the above embodiment and modifications, since the pixel value of the RGB image is converted from the RGB value into the XYZ value, there is a concern that an error is included at the time of conversion. For example, in business applications and the like, a case is assumed in which information related to a degree of error occurring or information related to the reliability of color reproduction is required.

Figure 12:
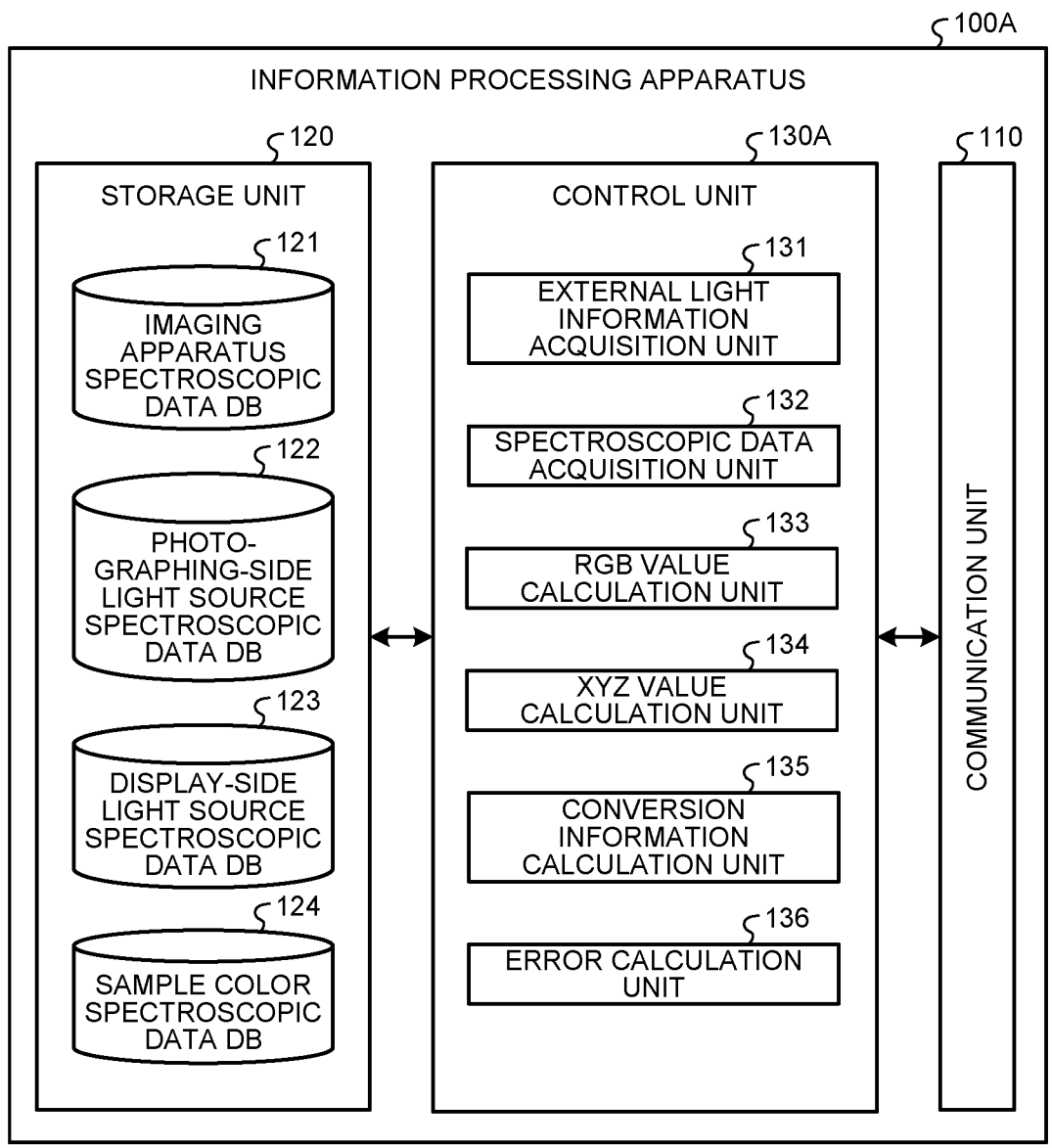
FIG. 12 is a block diagram illustrating a configuration example of an information processing apparatus according to a fourth modification of the embodiment of the present disclosure.

Therefore, in the fourth modification, an information processing apparatus 100A that calculates such a conversion error will be described. FIG. 12 is a block diagram illustrating a configuration example of the information processing apparatus 100A according to the fourth modification of the embodiment of the present disclosure. Note that the same components as those of the information processing apparatus 100 illustrated in FIG. 4 are denoted by the same reference numerals, and description thereof is omitted.

As illustrated in FIG. 12, a control unit 130A of the information processing apparatus 100A includes an error calculation unit 136. The error calculation unit 136 estimates an error that occurs at the time of conversion processing of the conversion apparatus 200, and displays an estimation result on the display apparatus 500, for example.

Figure 13:
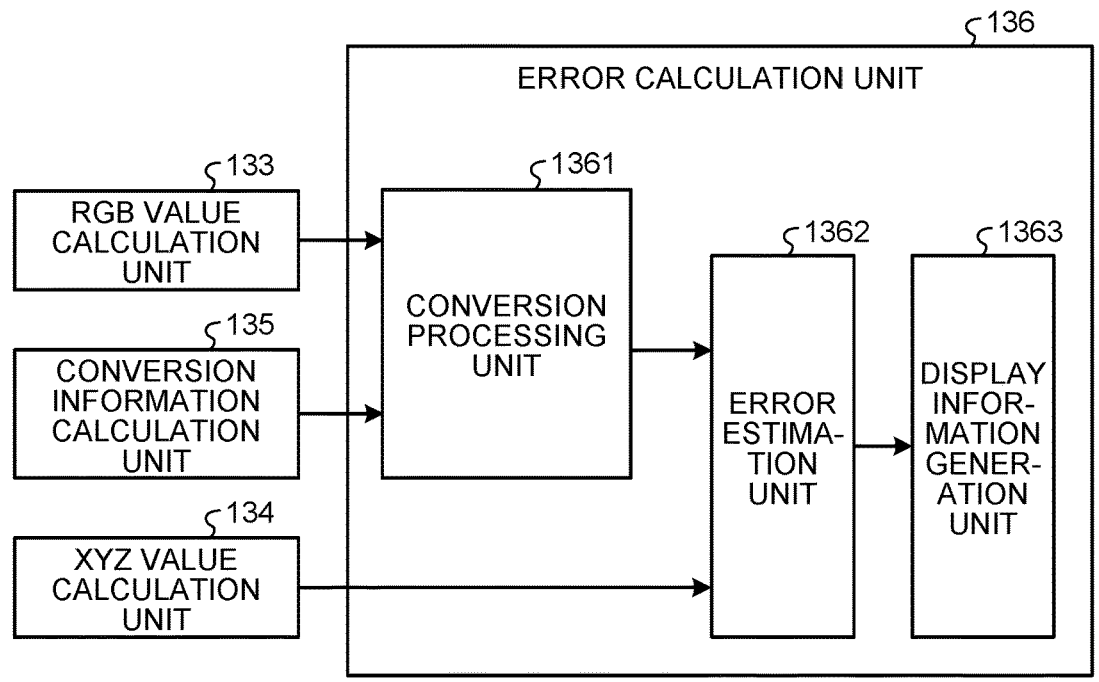
FIG. 13 is a block diagram illustrating a configuration example of an error calculation unit according to the fourth modification of the embodiment of the present disclosure.

FIG. 13 is a block diagram illustrating a configuration example of the error calculation unit 136 according to the fourth modification of the embodiment of the present disclosure. The error calculation unit 136 illustrated in FIG. 13 includes a conversion processing unit 1361, an error estimation unit 1362, and a display information generation unit 1363.

By using the RGB value calculated by the RGB value calculation unit 133 and the conversion information calculated by the conversion information calculation unit 135, the conversion processing unit 1361 converts the RGB value calculated by the RGB value calculation unit 133 into an XYZ value.

The error estimation unit 1362 compares the XYZ value (hereinafter, also referred to as converted XYZ value) converted by the conversion processing unit 1361 with the XYZ value (hereinafter, also referred to as calculated XYZ value) calculated by the XYZ value calculation unit 134 to estimate an error.

For example, the error estimation unit 1362 calculates, as the error, a difference ($\Delta x$) in an X component and a difference ($\Delta y$) in a Y component between the converted XYZ value and the calculated XYZ value. Alternatively, the error estimation unit 1362 may calculate an average value, a maximum value, a standard deviation, and the like in all sample colors included in the color sample (color sample) as the error by using DE 2000 or the like of color difference calculation.

The error estimation unit 1362 outputs the calculated error to the display information generation unit 1363.

The display information generation unit 1363 generates display information to be displayed on the display apparatus 500 based on the information related to the error acquired from the error estimation unit 1362.

Figure 14:
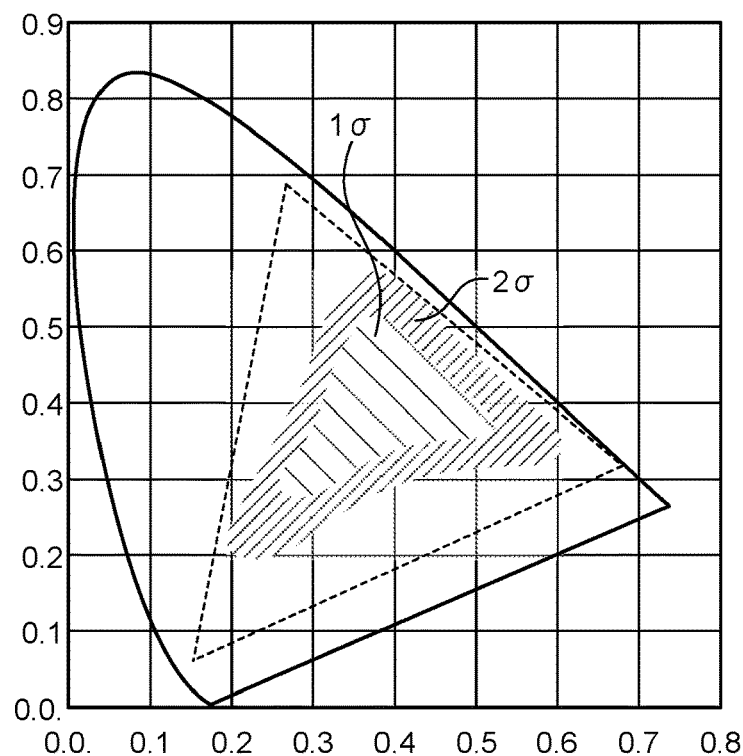
FIG. 14 is a diagram illustrating an example of display information according to the fourth modification of the embodiment of the present disclosure.

The display information generation unit 1363 sets at least one of the values calculated by the error estimation unit 1362 as the error, such as $\Delta x$, $\Delta y$, the average value, the maximum value, and the standard deviation described above, as the display information. Alternatively, for example, as illustrated in FIG. 14, the display information generation unit 1363 may generate, as the display information, a distribution diagram in which a calculated standard deviation $\sigma$ is plotted on an xy chromaticity diagram. Note that FIG. 14 is a diagram illustrating an example of the display information according to the fourth modification of the embodiment of the present disclosure. As described above, the display information generation unit 1363 generates the distribution diagram as the display information, so that the observer can grasp a coordinate reliability for each color at a glance.

Figure 15:
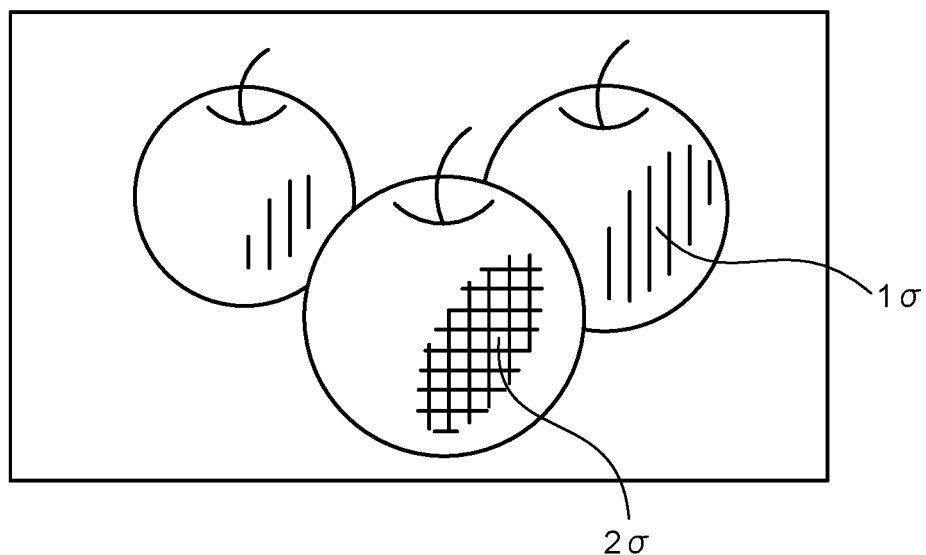
FIG. 15 is a diagram illustrating another example of the display information according to the fourth modification of the embodiment of the present disclosure.

Alternatively, the display information generation unit 1363 may generate display information in which the error information is superimposed on the converted image displayed on the display apparatus 500. FIG. 15 is a diagram illustrating another example of the display information according to the fourth modification of the embodiment of the present disclosure.

As illustrated in FIG. 15, for example, the display information generation unit 1363 acquires the converted image from the conversion apparatus 200, and superimposes and displays the standard deviation $\sigma$ on the converted image as a specific pattern, thereby generating the display information. For example, the display information generation unit 1363 compares each pixel value of the converted image with the converted XYZ value (or calculated XYZ value), determines the standard deviation σ corresponding to each pixel, and superimposes the determined standard deviation σ on the converted image as the specific pattern.

The display information generation unit 1363 generates the display information superimposed with the standard deviation σ as the specific pattern, so that the observer can grasp the coordinate reliability on the converted image at a glance.

Note that here, the display information generation unit 1363 acquires the converted image from the conversion apparatus 200 and generates the display information, but the present disclosure is not limited thereto. For example, the conversion apparatus 200 may acquire information related to the error from the error calculation unit 136 and generate the display information.

Furthermore, the information processing apparatus 100 may directly display the generated display information on the display apparatus 500, or may display the generated display information via the conversion apparatus 200. Furthermore, the display information may be presented not only to the display apparatus 500 but also to the photographing-side observer, for example, displayed on a display of the imaging apparatus 300.

4.5. Fifth Modification

<4.5.1. Outline Configuration Example of Information Processing System>

In the above-described embodiment, the information processing apparatus 100 acquires the characteristic data from the imaging apparatus spectroscopic data DB 121, but the present disclosure is not limited thereto. For example, the information processing apparatus 100 may estimate the characteristic data.

Therefore, in the fifth modification, an information processing apparatus 100B that estimates the characteristic data will be described. For example, the information processing apparatus 100B outputs the characteristic data based on the RGB value output by the imaging apparatus 300 and the spectroscopic characteristic data.

Here, the RGB value output by the imaging apparatus 300 described above is an RGB value output by the imaging apparatus 300 in a case where a sample color is photographed by using the imaging apparatus 300 under a certain light source. The spectroscopic characteristic data is spectroscopic characteristic data of each sample color imaged by the imaging apparatus 300 under the light source. The spectroscopic characteristic data can be acquired by using, for example, a spectrometer.

Figure 16:
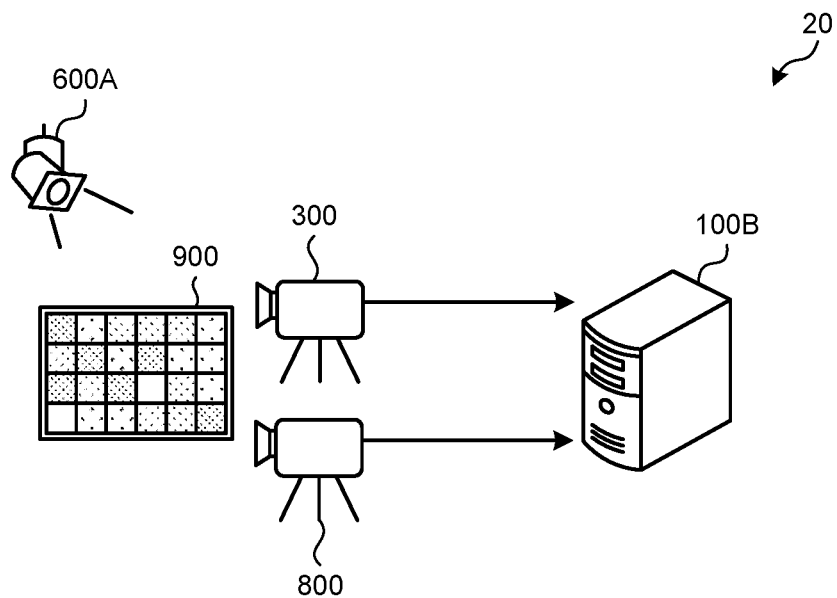
FIG. 16 is a diagram for describing an outline of an information processing system according to a fifth modification of the embodiment of the present disclosure.

FIG. 16 is a diagram for describing an outline of an information processing system 20 according to the fifth modification of the embodiment of the present disclosure. The information processing system 20 includes an information processing apparatus 100B, an imaging apparatus 300, and a spectrometer 800. In FIG. 16, among the components illustrated in FIG. 1A, some components not used for description in the present modification are omitted. In addition, in FIG. 16, the same components as those of the information processing system 10 in FIG. 1A are denoted by the same reference numerals, and description thereof is omitted.

When the imaging apparatus 300 photographs a color sample 900, the spectrometer 800 acquires spectroscopic characteristic data of each sample color included in the color sample 900 under a photographing-side light source (photographing-side illumination apparatus) 600A. Here, the spectroscopic characteristic data of each sample color corresponds to a product (photographing-side spectroscopic data*color spectroscopic data) of the photographing-side spectroscopic data related to the spectroscopic distribution characteristic of the light source in the imaging environment and the color spectroscopic data related to the spectroscopic reflectance characteristic of each sample color. The spectrometer 800 outputs the acquired spectroscopic characteristic data to the information processing apparatus 100B.

Note that the color sample 900 is a chart in which a plurality of sample colors are arranged, and is an imaging target of the imaging apparatus 300 and a measurement target of the spectrometer 800. For example, 24 sample colors may be arranged or 1000 to 2000 sample colors may be arranged in the color sample 900.

The information processing apparatus 100B calculates color spectroscopic data of each sample color and estimates characteristic data of the imaging apparatus 300. For example, the information processing apparatus 100B estimates characteristic data of the imaging apparatus 300 based on an RGB image obtained by imaging each sample color of the color sample 900 by the imaging apparatus 300 under the photographing-side light source 600A and spectroscopic characteristic data of each sample color in the photographing-side light source 600A acquired by the spectrometer 800.

<4.5.2. Configuration Example of Information Processing System>

Next, a configuration example of each apparatus of the information processing system 20 according to the fifth modification of the embodiment of the present disclosure will be described. Note that the same components as those of the information processing system 10 illustrated in FIG. 1A of the information processing system according to the fifth modification of the embodiment of the present disclosure are denoted by the same reference numerals, and description thereof is omitted.

[Spectrometer 800]

Figure 17:
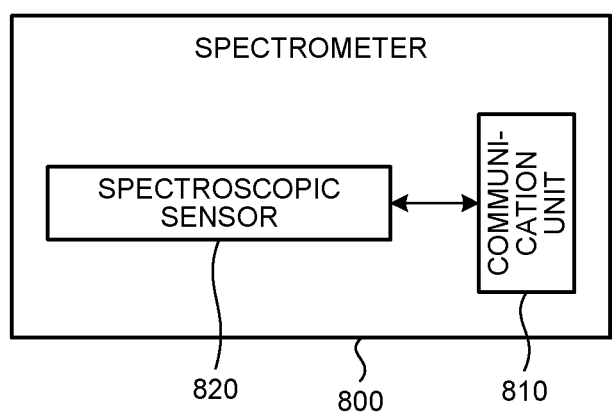
FIG. 17 is a block diagram illustrating a configuration example of a spectrometer according to the fifth modification of the embodiment of the present disclosure.

First, the spectrometer 800 will be described with reference to FIG. 17. FIG. 17 is a block diagram illustrating a configuration example of the spectrometer 800 according to the fifth modification of the embodiment of the present disclosure. The spectrometer 800 illustrated in FIG. 17 includes a communication unit 810 and a spectroscopic sensor 820.

(Communication Unit 810)

The communication unit 810 is a communication interface that communicates with an external apparatus via a network in a wired or wireless manner. The communication unit 810 is realized by, for example, a network interface card (NIC) or the like.

(Spectroscopic Sensor 820)

The spectroscopic sensor 820 is an apparatus that performs spectroscopic measurement of each sample color of the color sample 900 to generate spectroscopic characteristic data. The spectroscopic sensor 820 includes, for example, a plurality of sensors (not illustrated). The plurality of sensors are sensors that separate and extract light (color components) having different wavelengths. The spectroscopic sensor 820 separates, for example, light in a human visible range (380 nm to 780 nm in wavelength) into a plurality of beams for different wavelengths by using the plurality of sensors. Thus, the spectroscopic sensor 820 performs filter spectroscopic processing to separate and extract light of a predetermined wavelength.

The spectroscopic sensor 820 performs spectroscopic measurement of each sample color of the color sample 900 under the photographing-side light source 600A, and generates spectroscopic characteristic data for each sample color under the photographing-side light source 600A. In addition, the spectroscopic sensor 820 can acquire photographing-side spectroscopic data of the photographing-side light source 600A by measuring a spectroscopic distribution characteristic of the light sensor under the photographing-side light source 600A. Note that the spectroscopic characteristic data and the photographing-side spectroscopic data for each sample color for the plurality of photographing-side light sources 600A may be generated by performing the spectroscopic measurement while changing the plurality of photographing-side light sources 600A having different spectroscopic distribution characteristics.

Note that the spectroscopic sensor 820 can generate spectroscopic characteristic data by performing spectroscopy every 1 nm (400 divisions) in the range of 380 nm to 780 nm. Alternatively, the spectroscopic sensor 820 may generate spectroscopic characteristic data by performing spectroscopy every 5 nm (80 divisions) or every 10 nm (40 divisions).

The spectroscopic sensor 820 outputs the spectroscopic characteristic data of each sample color and the photographing-side spectroscopic data to the information processing apparatus 100B via the communication unit 810.

Note that here, the description has been given assuming that the spectrometer 800 is a separate apparatus from other apparatuses of the information processing system 20, but the present disclosure is not limited thereto. For example, the external light sensor 330 of the imaging apparatus 300 may be used as the spectrometer 800.

[Information Processing Apparatus 100B]

Figure 18:
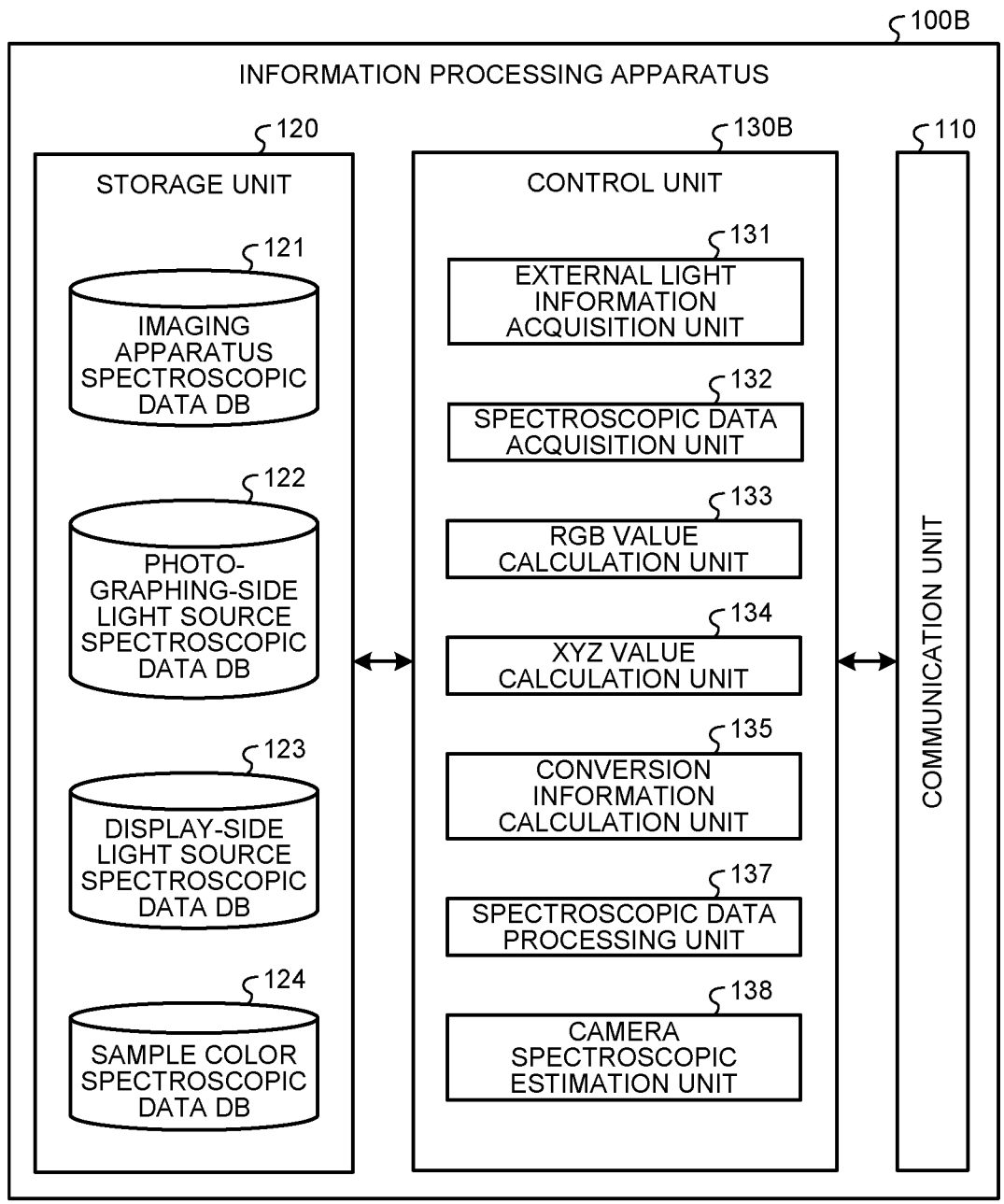
FIG. 18 is a block diagram illustrating a configuration example of an information processing apparatus according to the fifth modification of the embodiment of the present disclosure.

Next, the information processing apparatus 100B will be described with reference to FIG. 18. FIG. 18 is a block diagram illustrating a configuration example of the information processing apparatus 100B according to the fifth modification of the embodiment of the present disclosure. Note that the same components as those of the information processing apparatus 100 illustrated in FIG. 4 are denoted by the same reference numerals, and description thereof is omitted.

As illustrated in FIG. 18, a control unit 130B of the information processing apparatus 100B includes a spectroscopic data processing unit 137 and a camera spectroscopic estimation unit 138.

The spectroscopic data processing unit 137 calculates the color spectroscopic data of each sample color based on the spectroscopic characteristic data of each sample color acquired from the spectrometer 800 via the communication unit 110 and the photographing-side spectroscopic data. The spectroscopic data processing unit 137 stores the photographing-side spectroscopic data and the calculated color spectroscopic data of each sample color in the display-side light source spectroscopic data DB 123 and the sample color spectroscopic data DB 124, respectively.

The camera spectroscopic estimation unit 138 acquires an RGB image obtained by imaging each sample color from the imaging apparatus 300 via the communication unit 110. The camera spectroscopic estimation unit 138 acquires the spectroscopic characteristic data of each sample color from the spectrometer 800 via the communication unit 110. The camera spectroscopic estimation unit 138 estimates characteristic data related to a spectroscopic sensitivity characteristic of the imaging apparatus 300 based on the acquired RGB image and spectroscopic characteristic data, and stores the characteristic data in the imaging apparatus spectroscopic data DB 121.

[Control Unit 130B]

(Spectroscopic Data Processing Unit 137)

The spectroscopic data processing unit 137 acquires the spectroscopic characteristic data of each sample color and the photographing-side spectroscopic data from the spectroscopic sensor 820 of the spectrometer 800 via the communication unit 110. The spectroscopic data processing unit 137 calculates the color spectroscopic data of each sample color from the spectroscopic characteristic data corresponding to the product of the photographing-side spectroscopic data related to the spectroscopic distribution characteristic of the photographing-side light source 600A and the color spectroscopic data related to the spectroscopic reflectance characteristic of each sample color. For example, the spectroscopic data processing unit 137 calculates the color spectroscopic data of each sample color by dividing the spectroscopic characteristic data of each sample color by the photographing-side spectroscopic data.

The spectroscopic data processing unit 137 stores the acquired photographing-side spectroscopic data of the photographing-side light source 600A in the display-side light source spectroscopic data DB 123, and stores the calculated color spectroscopic data of each sample color in the sample color spectroscopic data DB 124.

(Camera Spectroscopic Estimation Unit 138)

The camera spectroscopic estimation unit 138 acquires an RGB image obtained by imaging each sample color from the imaging apparatus 300 via the communication unit 110, and acquires spectroscopic characteristic data of each sample color from the spectroscopic sensor 820 of the spectrometer 800. As will be described later, the camera spectroscopic estimation unit 138 performs estimation processing of characteristic data related to the spectroscopic sensitivity characteristic of the imaging apparatus 300 from the RGB value when each sample color is imaged and the spectroscopic characteristic data of each sample color.

The camera spectroscopic estimation unit 138 stores the estimated characteristic data related to the spectroscopic sensitivity characteristic of the imaging apparatus 300 in the imaging apparatus spectroscopic data DB 121.

[Example of Estimation Processing]

Figure 19:
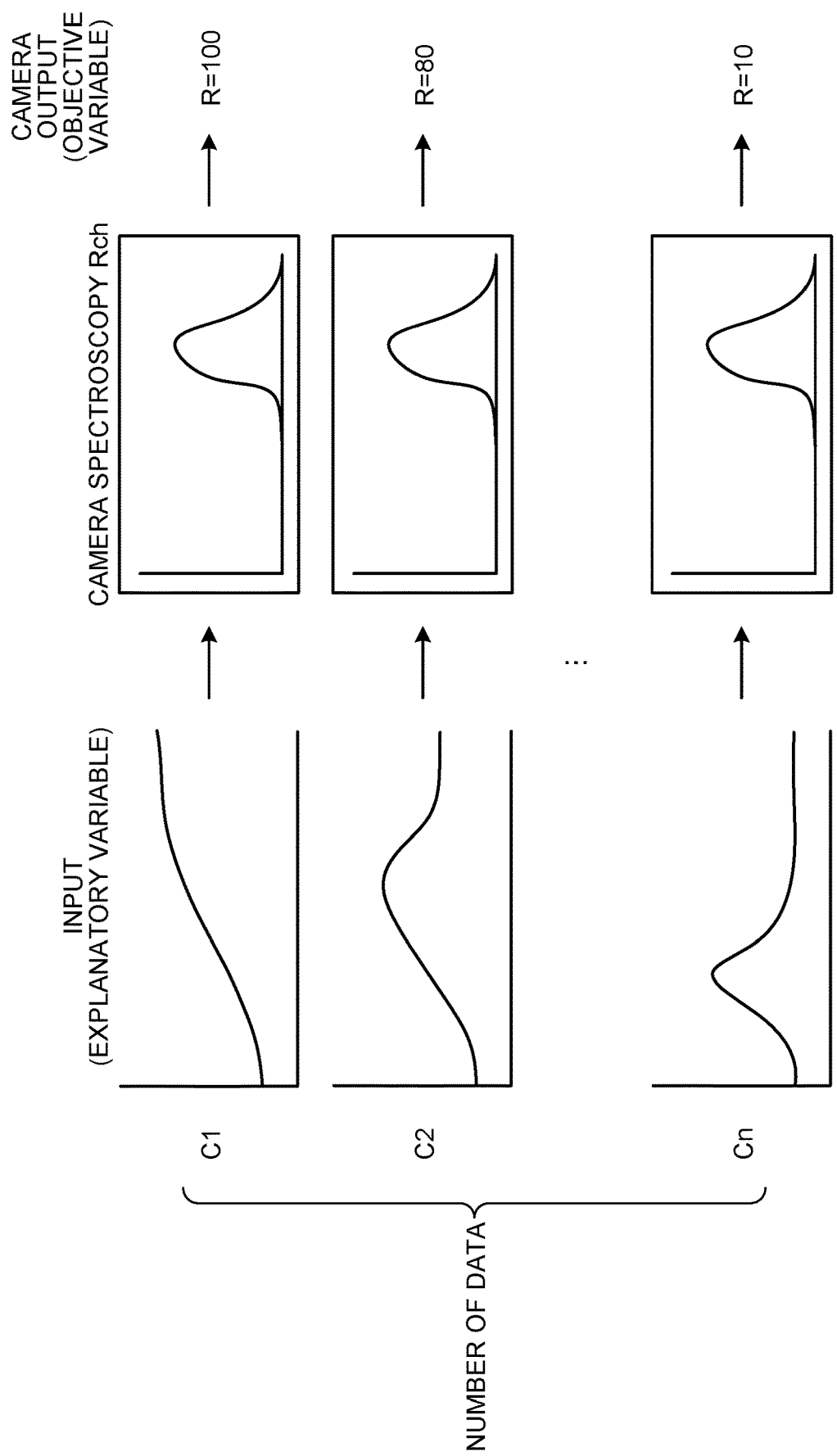
FIG. 19 is a diagram for describing an example of estimation processing according to the fifth modification of the embodiment of the present disclosure.

Next, an example of estimation processing according to the fifth modification of the embodiment of the present disclosure will be described with reference to FIG. 19. FIG. 19 is a diagram for describing an example of the estimation processing according to the fifth modification of the embodiment of the present disclosure. As described above, the characteristic data related to the spectroscopic sensitivity characteristic of the imaging apparatus 300 is estimated by the camera spectroscopic estimation unit 138 (see FIG. 18).

In the example illustrated in FIG. 19, the camera spectroscopic estimation unit 138 performs multiple regression analysis with the RGB value when each sample color is imaged as an objective variable and spectroscopic characteristic data of each sample color as an explanatory variable. As a result, the camera spectroscopic estimation unit 138 calculates a weighting coefficient (partial regression coefficient) for each wavelength of light and estimates characteristic data related to the spectroscopic sensitivity characteristic of the imaging apparatus 300.

For a sample color C1 of the color sample 900, the camera spectroscopic estimation unit 138 uses the spectroscopic characteristic data of the sample color C1 as the explanatory variable, and uses each of the RGB values of the RGB image obtained by imaging the sample color C1 as the objective variable. In the example illustrated in FIG. 19, the estimation processing is performed with the value of R (value corresponding to red light) of the RGB image output by the imaging apparatus 300 as the objective variable.

For example, in a case where the value of R of the RGB image obtained by imaging the sample color C1 is 100, the camera spectroscopic estimation unit 138 estimates a red spectroscopic sensitivity characteristic of the imaging apparatus 300 that images the sample color C1 and outputs a value of R=100. With respect to the spectroscopic characteristic data of the sample color C1, the camera spectroscopic estimation unit 138 calculates a weighting coefficient for each division such that R=100 with a value for each division as an explanatory variable. For example, for the spectroscopic characteristic data of the sample color C1 based on the spectroscopy for every 1 nm, 400 weighting coefficients for 400 explanatory variables are calculated.

Similarly, with respect to a sample color C2 of the color sample 900, the camera spectroscopic estimation unit 138 calculates a weighting coefficient for each division by using a value of spectroscopic characteristic data for each division as an explanatory variable and using a value of R (R=80 in the example illustrated in FIG. 19) of the RGB image obtained by imaging the sample color C2 as an objective variable. By repeating similar processing up to a sample color Cn of the color sample 900, characteristic data related to the red spectroscopic sensitivity characteristic of the imaging apparatus 300 that can explain a camera output (value of R) with respect to a camera input (spectroscopic characteristic data) is estimated.

Similarly, the camera spectroscopic estimation unit 138 performs multiple regression analysis with the spectroscopic characteristic data of the sample colors C1 to Cn as objective variables and a value of G (value corresponding to green light) and a value of B (value corresponding to blue light) of the RGB image as explanatory variables, thereby estimating characteristic data related to green and blue spectroscopic sensitivity characteristics of the imaging apparatus 300.

Note that, in a case where the data of the sample colors C1 to Cn is used, n RGB images obtained by imaging each sample color and n pieces of spectroscopic characteristic data of each sample color are acquired. However, in a case where the photographing-side light source 600A is changed to a light source having a different spectroscopic distribution characteristic, RGB values and spectroscopic characteristic data of RGB images for similar sample colors C1 to Cn have different values. That is, m*n RGB images output by the imaging apparatus 300 in a case where each sample color is photographed under m light sources having different spectroscopic distribution characteristics, and m*n pieces of spectroscopic characteristic data of each sample color under the m light sources are acquired. For example, in a case where 24 sample colors are photographed under three types of photographing-side light sources 600A having different spectroscopic distribution characteristics, 72 RGB images obtained by imaging each sample color and 72 pieces of spectroscopic characteristic data of each sample color are acquired.

<4.5.3. Information Processing of Information Processing System>

Next, estimation processing executed by the information processing apparatus 100B according to the fifth modification of the embodiment of the present disclosure will be described. FIG. 20 is a flowchart illustrating a flow of an example of information processing executed by the information processing apparatus 100B according to the fifth modification of the embodiment of the present disclosure.

The information processing apparatus 100B executes estimation processing of characteristic data related to the spectroscopic sensitivity characteristic of the imaging apparatus 300 as the information processing. The information processing apparatus 100B executes the estimation processing at a predetermined timing, for example.

As illustrated in FIG. 20, the information processing apparatus 100B acquires spectroscopic characteristic data and photographing-side spectroscopic data (step S301). The information processing apparatus 100B acquires spectroscopic characteristic data of each sample color and photographing-side spectroscopic data of the photographing-side light source 600A from the spectroscopic sensor 820.

Next, the information processing apparatus 100B calculates color spectroscopic data (step S302). For example, the information processing apparatus 100B calculates the color spectroscopic data of each sample color by dividing the spectroscopic characteristic data of each sample color by the photographing-side spectroscopic data.

The information processing apparatus 100B stores the photographing-side spectroscopic data and the color spectroscopic data (step S303). The information processing apparatus 100B stores the acquired photographing-side spectroscopic data in the display-side light source spectroscopic data DB 123, and stores the calculated color spectroscopic data of each sample color in the sample color spectroscopic data DB 124.

The information processing apparatus 100B acquires an RGB image and spectroscopic characteristic data (step S304). The information processing apparatus 100B acquires an RGB image obtained by imaging each sample color from the imaging apparatus 300, and acquires spectroscopic characteristic data of each sample color from the spectroscopic sensor 820 of the spectrometer 800. As the spectroscopic characteristic data of each sample color, the spectroscopic characteristic data acquired in step S301 may be used.

The information processing apparatus 100B estimates characteristic data (step S305). For example, the information processing apparatus 100B performs multiple regression analysis with an RGB value of an RGB image obtained by imaging each sample color as an objective variable and spectroscopic characteristic data of each sample color as an explanatory variable, thereby estimating characteristic data related to the spectroscopic sensitivity characteristic of each color of RGB of the imaging apparatus 300.

The information processing apparatus 100B stores the characteristic data (step S306). The information processing apparatus 100B stores the estimated characteristic data related to the spectroscopic sensitivity characteristic of the imaging apparatus 300 in the imaging apparatus spectroscopic data DB 121.

As described above, in the information processing system 20 according to the fifth modification of the embodiment of the present disclosure, the information processing apparatus 100B performs the estimation processing of the characteristic data related to the spectroscopic sensitivity characteristic of the imaging apparatus 300 from the RGB value when each sample color is imaged and the spectroscopic characteristic data of each sample color. Furthermore, the information processing apparatus 100B stores the estimated characteristic data related to the spectroscopic sensitivity characteristic of the imaging apparatus 300 in the imaging apparatus spectroscopic data DB 121. As a result, an imaging apparatus in which characteristic data related to a unique spectroscopic sensitivity characteristic is not clear can also be used as the imaging apparatus 300 in the information processing system 10.

Note that although a case where the above-described information processing system 20 estimates the characteristic data related to the spectroscopic sensitivity characteristic of the imaging apparatus 300 by performing the multiple regression analysis is described, the present disclosure is not limited thereto. For example, the characteristic data related to the spectroscopic sensitivity characteristic of the imaging apparatus 300 may be estimated by using an algorithm different from the multiple regression analysis such as machine learning.

5. Other Embodiments

The above-described embodiment and modifications are examples, and various modifications and applications are possible.

For example, the control apparatus that controls the information processing apparatus 100 and the conversion apparatus 200 of the present embodiment may be realized by a dedicated computer system or a general-purpose computer system.

For example, a communication program for executing the above-described operation is stored and distributed in a computer-readable recording medium such as an optical disk, a semiconductor memory, a magnetic tape, or a flexible disk. Then, for example, the control apparatus is configured by installing the program in the computer, and executing the above-described processing. At this time, the control apparatus may be an apparatus (for example, a personal computer) outside the information processing apparatus 100 and the conversion apparatus 200. Furthermore, the control apparatus may be an apparatus (for example, the control units 130 and 230) in the information processing apparatus 100 and the conversion apparatus 200.

In addition, the communication program may be stored in a disk apparatus included in a server apparatus on a network such as the Internet so that the communication program can be downloaded to the computer. In addition, the above-described functions may be realized by cooperation of an operating system (OS) and application software. In this case, a portion other than the OS may be stored in a medium and distributed, or a portion other than the OS may be stored in the server apparatus and downloaded to the computer.

In addition, among each of the processing described in the above embodiment, all or a part of the processing described as being automatically performed can be manually performed, or all or a part of the processing described as being manually performed can be automatically performed by a known method. In addition, the processing procedure, specific name, and various types of information including data and parameters indicated in the specification and the drawings can be arbitrarily changed unless otherwise specified. For example, the various types of information indicated in each drawing are not limited to the illustrated information.

In addition, each component of each apparatus illustrated in the drawings is functionally conceptual, and is not necessarily physically configured as illustrated in the drawings. That is, a specific form of distribution and integration of each apparatus is not limited to the illustrated form, and all or a part thereof can be functionally or physically distributed and integrated in an arbitrary unit according to various loads, usage conditions, and the like. Note that this configuration by distribution and integration may be performed dynamically.

In addition, above-described embodiments can be appropriately combined within a range that does not contradict processing contents. Furthermore, the order of each step illustrated in the sequence diagram of the above-described embodiment can be changed as appropriate.

Furthermore, for example, the present embodiment can be implemented as any configuration constituting an apparatus or a system, for example, a processor as a system large scale integration (LSI) or the like, a module using a plurality of processors or the like, a unit using a plurality of modules or the like, a set obtained by further adding other functions to a unit or the like (that is, a configuration of a part of the apparatus).

Note that, in the present embodiment, the system means a set of a plurality of components (apparatuses, modules (parts), or the like), and it does not matter whether all the components are in the same housing. Therefore, a plurality of apparatuses housed in separate housings and coupled via the network and one apparatus in which a plurality of modules are housed in one housing are both systems.

Furthermore, for example, the present embodiment can adopt a configuration of cloud computing in which one function is shared and processed by a plurality of apparatuses in cooperation via the network.

6. Conclusion

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Furthermore, the effects of the embodiments described in the present specification are merely examples and are not limited, and other effects may be provided.

Note that the present technology can also have the following configurations.

(1)

An information processing apparatus comprising:
a control unit configured to
acquire characteristic data related to a spectroscopic sensitivity characteristic of an imaging apparatus,
acquire photographing-side spectroscopic data related to a spectroscopic distribution characteristic of a light source in a photographing environment in which the imaging apparatus performs imaging,
acquire color spectroscopic data related to a spectroscopic reflectance characteristic of a predetermined color,
calculate an RGB value output by the imaging apparatus when imaging of the predetermined color is performed by using the imaging apparatus by using the characteristic data, the photographing-side spectroscopic data, and the color spectroscopic data,
acquire display-side spectroscopic data related to a spectroscopic distribution characteristic of a light source in a display environment in which imaged data imaged by the imaging apparatus is displayed on a display apparatus,
calculate an XYZ value when the predetermined color is displayed on the display apparatus by using the display-side spectroscopic data and the color spectroscopic data, and
calculate conversion information for converting the RGB value into the XYZ value.

(2)

The information processing apparatus according to (1), wherein the control unit selects the display-side spectroscopic data of the light source in the display environment from among a plurality of pieces of the display-side spectroscopic data corresponding to each of a plurality of the light sources based on display-side external light information acquired by a sensor in the display environment.

(3)

The information processing apparatus according to (2), wherein the control unit selects the display-side spectroscopic data of the light source in the display environment based on a comparison result between a result of filter spectroscopic processing by the sensor and a result of the filter spectroscopic processing on the plurality of pieces of display-side spectroscopic data corresponding to each of the plurality of light sources.

(4)

The information processing apparatus according to any one of (1) to (3), wherein the control unit selects the photographing-side spectroscopic data of the light source in the photographing environment from among a plurality of pieces of the photographing-side spectroscopic data corresponding to each of the plurality of light sources based on an instruction from a user.

(5)

The information processing apparatus according to any one of (1) to (4), wherein the control unit selects the photographing-side spectroscopic data of the light source in the photographing environment from among a plurality of pieces of the photographing-side spectroscopic data corresponding to each of a plurality of the light sources based on photographing-side external light information acquired by a sensor in the photographing environment.

(6)

The information processing apparatus according to (5), wherein the control unit selects the photographing-side spectroscopic data of the light source in the photographing environment based on a comparison result between a result of filter spectroscopic processing by the sensor and a result of the filter spectroscopic processing on the plurality of pieces of photographing-side spectroscopic data corresponding to each of the plurality of light sources.

(7)

The information processing apparatus according to any one of (1) to (6), wherein the control unit generates presentation information for presenting information related to the light source disposed in the photographing environment according to the display apparatus.

(8)

The information processing apparatus according to any one of (1) to (7), wherein a spectroscopic distribution of the light source in the photographing environment and a spectroscopic distribution of the display apparatus are substantially the same.

(9)

The information processing apparatus according to any one of (1) to (8), wherein the control unit calculates an error in a case where the RGB value is converted into the XYZ value based on the conversion information, and generates presentation information for presenting information related to the error.

(10)

The information processing apparatus according to (9), wherein the control unit calculates the error by comparing the converted XYZ value obtained by converting the RGB value by using the conversion information with the XYZ value.

(11)

The information processing apparatus according to any one of (1) to (10), wherein the control unit converts each pixel value of an imaged image imaged by the imaging apparatus from the RGB value into the XYZ value by using the conversion information.

(12)

An information processing method comprising: acquiring characteristic data related to a spectroscopic sensitivity characteristic of an imaging apparatus;
acquiring photographing-side spectroscopic data related to a spectroscopic distribution characteristic of a light source in a photographing environment in which the imaging apparatus performs imaging;
acquiring color spectroscopic data related to a spectroscopic reflectance characteristic of a predetermined color;
calculating an RGB value output by the imaging apparatus when imaging of the predetermined color is performed by using the imaging apparatus by using the characteristic data, the photographing-side spectroscopic data, and the color spectroscopic data;
acquiring display-side spectroscopic data related to a spectroscopic distribution characteristic of a light source in a display environment in which imaged data imaged by the imaging apparatus is displayed on a display apparatus;
calculating an XYZ value when the predetermined color is displayed on the display apparatus by using the display-side spectroscopic data and the color spectroscopic data; and
calculating conversion information for converting the RGB value into the XYZ value.

(13)

The information processing apparatus according to any one of (1) to (11), wherein
the control unit estimates the characteristic data based on an RGB value output by the imaging apparatus and spectroscopic characteristic data of the predetermined color.

(14)

The information processing apparatus according to (13), wherein
the spectroscopic characteristic data of the predetermined color corresponds to a product of photographing-side spectroscopic data related to the spectroscopic distribution characteristic of the light source when generating the spectroscopic characteristic data and the color spectroscopic data.

(15)

The information processing apparatus according to (13) or (14), wherein
the control unit stores the estimated characteristic data in a storage unit, and calculates the RGB value by using the characteristic data acquired from the storage unit.

(16)

The information processing apparatus according to any one of (1) to (11), wherein
the control unit estimates the characteristic data by performing multiple regression analysis with the RGB value output by the imaging apparatus as an objective variable and spectroscopic characteristic data of the predetermined color as an explanatory variable.

REFERENCE SIGNS LIST 10, 20 INFORMATION PROCESSING SYSTEM
100 INFORMATION PROCESSING APPARATUS
110, 210, 310, 810 COMMUNICATION UNIT
120, 220 STORAGE UNIT
130, 230 CONTROL UNIT
131 EXTERNAL LIGHT INFORMATION ACQUISITION UNIT
132 SPECTROSCOPIC DATA ACQUISITION UNIT
133 RGB VALUE CALCULATION UNIT
134 XYZ VALUE CALCULATION UNIT
135 CONVERSION INFORMATION CALCULATION UNIT
137 SPECTROSCOPIC DATA PROCESSING UNIT
138 CAMERA SPECTROSCOPIC ESTIMATION UNIT
200 CONVERSION APPARATUS
231 CONVERSION INFORMATION ACQUISITION UNIT
232 CONVERSION PROCESSING UNIT
233 DISPLAY CONTROL UNIT
300 IMAGING APPARATUS
320 IMAGING UNIT
330, 510 EXTERNAL LIGHT SENSOR
400 SUBJECT
500 DISPLAY APPARATUS
600 ILLUMINATION APPARATUS
800 SPECTROMETER
820 SPECTROSCOPIC SENSOR

The invention claimed is:

1. An information processing apparatus comprising:
a control unit configured to
acquire characteristic data related to a spectroscopic sensitivity characteristic of an imaging apparatus,
acquire photographing-side spectroscopic data related to a spectroscopic distribution characteristic of a light source in a photographing environment in which the imaging apparatus performs imaging,
acquire color spectroscopic data related to a spectroscopic reflectance characteristic of a predetermined color,
calculate an RGB value output by the imaging apparatus when imaging of the predetermined color is performed by using the imaging apparatus by using the characteristic data, the photographing-side spectroscopic data, and the color spectroscopic data,
acquire display-side spectroscopic data related to a spectroscopic distribution characteristic of a light source in a display environment in which imaged data imaged by the imaging apparatus is displayed on a display apparatus,
calculate an XYZ value when the predetermined color is displayed on the display apparatus by using the display-side spectroscopic data and the color spectroscopic data, and
calculate conversion information for converting the RGB value into the XYZ value.

2. The information processing apparatus according to claim 1, wherein the control unit selects the display-side spectroscopic data of the light source in the display environment from among a plurality of pieces of the display-side spectroscopic data corresponding to each of a plurality of the light sources based on display-side external light information acquired by a sensor in the display environment.

3. The information processing apparatus according to claim 2, wherein the control unit selects the display-side spectroscopic data of the light source in the display environment based on a comparison result between a result of filter spectroscopic processing by the sensor and a result of the filter spectroscopic processing on the plurality of pieces of display-side spectroscopic data corresponding to each of the plurality of light sources.

4. The information processing apparatus according to claim 1, wherein the control unit selects the photographing-side spectroscopic data of the light source in the photographing environment from among a plurality of pieces of the photographing-side spectroscopic data corresponding to each of the plurality of light sources based on an instruction from a user.

5. The information processing apparatus according to claim 1, wherein the control unit selects the photographing-side spectroscopic data of the light source in the photographing environment from among a plurality of pieces of the photographing-side spectroscopic data corresponding to each of a plurality of the light sources based on photographing-side external light information acquired by a sensor in the photographing environment.

6. The information processing apparatus according to claim 5, wherein the control unit selects the photographing-side spectroscopic data of the light source in the photographing environment based on a comparison result between a result of filter spectroscopic processing by the sensor and a result of the filter spectroscopic processing on the plurality of pieces of photographing-side spectroscopic data corresponding to each of the plurality of light sources.

7. The information processing apparatus according to claim 1, wherein the control unit generates presentation information for presenting information related to the light source disposed in the photographing environment according to the display apparatus.

8. The information processing apparatus according to claim 1, wherein a spectroscopic distribution of the light source in the photographing environment and a spectroscopic distribution of the display apparatus are substantially the same.

9. The information processing apparatus according to claim 1, wherein the control unit calculates an error in a case where the RGB value is converted into the XYZ value based on the conversion information, and generates presentation information for presenting information related to the error.

10. The information processing apparatus according to claim 9, wherein the control unit calculates the error by comparing the converted XYZ value obtained by converting the RGB value by using the conversion information with the XYZ value.

11. The information processing apparatus according to claim 1, wherein the control unit converts each pixel value of an imaged image imaged by the imaging apparatus from the RGB value into the XYZ value by using the conversion information.

12. The information processing apparatus according to claim 1, wherein
the control unit estimates the characteristic data based on an RGB value output by the imaging apparatus and spectroscopic characteristic data of the predetermined color.

13. The information processing apparatus according to claim 12, wherein
the spectroscopic characteristic data of the predetermined color corresponds to a product of photographing-side spectroscopic data related to the spectroscopic distribution characteristic of the light source when generating the spectroscopic characteristic data and the color spectroscopic data.

14. The information processing apparatus according to claim 12, wherein
the control unit stores the estimated characteristic data in a storage unit, and calculates the RGB value by using the characteristic data acquired from the storage unit.

15. The information processing apparatus according to claim 1, wherein
the control unit estimates the characteristic data by performing multiple regression analysis with the RGB value output by the imaging apparatus as an objective variable and spectroscopic characteristic data of the predetermined color as an explanatory variable.

16. An information processing method comprising:
acquiring characteristic data related to a spectroscopic sensitivity characteristic of an imaging apparatus;
acquiring photographing-side spectroscopic data related to a spectroscopic distribution characteristic of a light source in a photographing environment in which the imaging apparatus performs imaging;
acquiring color spectroscopic data related to a spectroscopic reflectance characteristic of a predetermined color;
calculating an RGB value output by the imaging apparatus when imaging of the predetermined color is performed by using the imaging apparatus by using the characteristic data, the photographing-side spectroscopic data, and the color spectroscopic data;
acquiring display-side spectroscopic data related to a spectroscopic distribution characteristic of a light source in a display environment in which imaged data imaged by the imaging apparatus is displayed on a display apparatus;
calculating an XYZ value when the predetermined color is displayed on the display apparatus by using the display-side spectroscopic data and the color spectroscopic data; and
calculating conversion information for converting the RGB value into the XYZ value.

* * * * *